United States Patent
Steere et al.

(10) Patent No.: US 7,278,200 B2
(45) Date of Patent: Oct. 9, 2007

(54) METHOD OF TENSIONING A DIAPHRAGM FOR AN ELECTRO-DYNAMIC LOUDSPEAKER

(75) Inventors: John F. Steere, Martinsville, IN (US); David B. Garner, Indianapolis, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 553 days.

(21) Appl. No.: 10/429,165

(22) Filed: May 2, 2003

(65) Prior Publication Data

US 2004/0022407 A1    Feb. 5, 2004

Related U.S. Application Data

(60) Provisional application No. 60/380,001, filed on May 2, 2002, provisional application No. 60/378,188, filed on May 6, 2002, provisional application No. 60/391,134, filed on Jun. 24, 2002.

(51) Int. Cl.
*H04R 31/00*    (2006.01)

(52) U.S. Cl. .............. 29/594; 29/592.1; 29/609.1; 156/250; 156/267; 156/292; 156/293; 156/297; 264/212; 264/216; 264/320; 264/323; 264/331.12; 381/113; 381/116; 381/119; 381/174; 381/398; 381/408; 381/431

(58) Field of Classification Search ............... 29/592.1, 29/594, 609.1; 381/398, 408, 431, 113, 116, 381/119, 174; 264/212, 216, 320, 323, 331.12; 156/731, 250, 267, 292, 293, 297
See application file for complete search history.

(56) References Cited

U.S. PATENT DOCUMENTS

| 1,643,791 A | 9/1927 | Slepian |
| 3,141,071 A | 7/1964 | Rich |
| 3,164,686 A | 1/1965 | Tibbetts |
| 3,570,626 A | 3/1971 | Mochida et al. |

(Continued)

FOREIGN PATENT DOCUMENTS

FR    2 765 767    1/1999

(Continued)

OTHER PUBLICATIONS

"Dynamic Amplitude Shading of Electronically Steered Line Source Arrays," an Audio Engineering Society Preprint 3272; Richard Schmidmaier, Munchen, Germany; David G. Meyer, School of Electrical Engineering, Purdue University, West Lafayette, Indiana, (1992).

(Continued)

*Primary Examiner*—Paul D. Kim
(74) *Attorney, Agent, or Firm*—Pauley Petersen & Erickson

(57) ABSTRACT

Electro-dynamic loudspeakers typically include a diaphragm having a conductor applied to one of its surfaces. The diaphragm is secured to a frame. The conductor is connected to a power supply for providing electrical current through linear traces of the conductor that interact with magnetic fields generated by magnets that are mounted to the frame. The diaphragm is driven by a motive force created when current passes through the conductor within the magnetic field. The electrical current is varied to create an acoustical output from the electro-dynamic loudspeaker. Different methods of tensioning the diaphragm are provided for simplifying the manufacturing process and for assuring proper diaphragm tension.

24 Claims, 25 Drawing Sheets

U.S. PATENT DOCUMENTS

| | | | |
|---|---|---|---|
| 3,654,403 | A | 4/1972 | Bobb |
| 3,674,946 | A | 7/1972 | Winey |
| 3,919,499 | A | 11/1975 | Winey |
| 4,037,061 | A | 7/1977 | von Recklinghausen |
| 4,088,915 | A * | 5/1978 | Kodama .................... 310/334 |
| 4,210,786 | A | 7/1980 | Winey |
| 4,264,789 | A | 4/1981 | Kaizu et al. |
| 4,281,223 | A | 7/1981 | Ugaji et al. |
| 4,316,062 | A | 2/1982 | Beveridge |
| 4,384,173 | A | 5/1983 | Briefer et al. |
| 4,468,530 | A | 8/1984 | Torgeson |
| 4,471,172 | A | 9/1984 | Winey |
| 4,471,173 | A | 9/1984 | Winey |
| 4,480,155 | A | 10/1984 | Winey |
| 4,484,037 | A | 11/1984 | Nieuwendijk et al. |
| 4,536,623 | A | 8/1985 | Larson |
| 4,544,805 | A | 10/1985 | Sawafuji et al. |
| 4,584,439 | A | 4/1986 | Paddock |
| 4,653,103 | A | 3/1987 | Mori et al. |
| 4,703,510 | A | 10/1987 | Larson |
| 4,723,296 | A | 2/1988 | Nieuwendijk et al. |
| 4,750,257 | A | 6/1988 | Larson |
| 4,803,733 | A | 2/1989 | Carver et al. |
| 4,837,838 | A | 6/1989 | Thigpen et al. |
| 4,924,504 | A | 5/1990 | Burton |
| 4,939,784 | A | 7/1990 | Bruney |
| 5,021,613 | A | 6/1991 | Garcia |
| 5,148,493 | A | 9/1992 | Bruney |
| 5,195,143 | A | 3/1993 | Spiegel |
| 5,283,836 | A | 2/1994 | Trufitt |
| 5,297,214 | A | 3/1994 | Bruney |
| 5,430,805 | A | 7/1995 | Stevenson et al. |
| 5,627,903 | A | 5/1997 | Porrazzo et al. |
| 5,764,595 | A | 6/1998 | Power |
| 5,850,461 | A | 12/1998 | Zelinka |
| 5,901,235 | A | 5/1999 | Thigpen |
| 5,905,805 | A | 5/1999 | Hansen |
| 5,953,438 | A | 9/1999 | Stevenson et al. |
| 5,961,762 | A | 10/1999 | Zelinka et al. |
| 6,008,714 | A | 12/1999 | Okuda et al. |
| 6,097,830 | A | 8/2000 | Zelinka et al. |
| 6,104,825 | A | 8/2000 | Thigpen |
| 6,154,557 | A | 11/2000 | Montour et al. |
| 6,185,310 | B1 | 2/2001 | Kermani et al. |
| 6,546,106 | B2 | 4/2003 | Azima |
| 6,845,166 | B2 | 1/2005 | Hara et al. |
| 6,934,402 | B2 * | 8/2005 | Croft et al. .................. 381/412 |
| 2001/0009586 | A1 | 7/2001 | Suzuki |
| 2001/0048256 | A1 | 12/2001 | Miyazaki et al. |
| 2002/0191808 | A1 | 12/2002 | Croft, III et al. |

FOREIGN PATENT DOCUMENTS

JP    59017800 A  *  1/1984

OTHER PUBLICATIONS

"Line Arrays: Theory and Applications," Audio Engineering Society, Convention Paper 5304; Mark S. Ureda, JBL Professional, Northridge, CA; presented at the 110th Convention May 12-15, 2001, Amsterdam, The Netherlands, (1975).

EDM Charmilles; A Practical Guide to Electro-Discharge Machining; Ateliers des Charmilles S.A. (p. 12-13).

Furihata et al., "Acoustic characteristics of an electrodynamic planar digital loudspeaker." J Acoustical Society of America 114(1):174-184, Jul. 2003.

"Analysis of Loudspeaker Line Arrays" by Mark S. Ureda, J. Audio Eng. Soc., vol. 52 No. 5.. May 2004.

* cited by examiner

METHOD OF TENSIONING A DIAPHRAGM FOR AN ELECTRO-DYNAMIC LOUDSPEAKER

CROSS-REFERENCE TO RELATED APPLICATIONS

This application claims the benefit of U.S. Provisional Application No. 60/380,001, filed on May 2, 2002; U.S. Provisional Application No. 60/378,188, filed on May 6, 2002; and U.S. Provisional Application No. 60/391,134, filed on Jun. 24, 2002. The disclosures of the above applications are incorporated herein by reference.

This application incorporates by reference the disclosures of each of the following co-pending applications which have been filed concurrently with this application: U.S. patent application Ser. No. 10/428,313, entitled "Mounting Bracket System," filed May 2, 2003; U.S. patent application Ser. No. 10/428,316, entitled "Film Attaching System," filed May 2, 2003; U.S. patent application Ser. No. 10/429,228, entitled "Electrical Connectors for Electro-Dynamic Loudspeakers," filed May 2, 2003; U.S. patent application Ser. No. 10/428,314, entitled "Electro-Dynamic Loudspeaker Mounting System," filed May 2, 2003; U.S. patent application Ser. No. 10/429,173, entitled "Conductors for Electro-Dynamic Loudspeakers," filed May 2, 2003; U.S. patent application Ser. No. 10/429,164, entitled "Frame Structure," filed May 2, 2003; U.S. patent application Ser. No. 10/429,289, entitled "Acoustically Enhanced Electro-Dynamic Loudspeakers," filed May 2, 2003; U.S. patent application Ser. No. 10/429,162, entitled "Directivity Control Of Electro-Dynamic Loudspeakers," filed May 2, 2003; U.S. Patent application Ser. No. 10/429,243, entitled "Frequency Response Enhancements For Electro-Dynamic Loudspeakers," filed May 2, 2003; and U.S. patent application Ser. No. 10/429,163, entitled "Magnet Arrangement for Loudspeaker," filed May 2, 2003.

BACKGROUND OF THE INVENTION

1. Field of Invention

The invention relates to electro-dynamic loudspeakers, and more particularly, to improvements for electro-dynamic loudspeakers and related manufacturing methods.

2. Related Art

The general construction of an electro-dynamic loudspeaker includes a diaphragm, in the form of a thin film, attached in tension to a frame. An electrical circuit, in the form of electrically conductive traces, is applied to the surface of the diaphragm. Magnetic sources, typically in the form of permanent magnets, are mounted adjacent to the diaphragm or within the frame, creating a magnetic field. When current is flowing in the electrical circuit, the diaphragm vibrates in response to the interaction between the current and the magnetic field. The vibration of the diaphragm produces the sound generated by the electro-dynamic loudspeaker.

Many design and manufacturing challenges present themselves in the manufacturing of electro-dynamic loudspeakers. First, the diaphragm, that is formed by a thin film, needs to be permanently attached, in tension, to the frame. Correct tension is required to optimize the resonance frequency of the diaphragm. Optimizing diaphragm resonance extends the bandwidth and reduces sound distortion of the loudspeaker.

The diaphragm is driven by the motive force created when current passes through the conductor applied to the diaphragm within the magnetic field. The conductor on the electro-dynamic loudspeaker is attached directly to the diaphragm. Because the conductor is placed directly onto the thin diaphragm, the conductor should be constructed of a material having a low mass and should also be securely attached to the film at high power (large current) and high temperatures.

The frame of the electro-dynamic loudspeaker supports the magnets, the diaphragm, and the terminal. The frame presents its own design challenges. The frame must be capable of being bonded to the diaphragm film. The frame must be rigid enough to maintain the diaphragm film in uniform tension and not be susceptible to deforming during handling, assembly, or over time. A ferrous frame has the advantage of being capable of carrying magnetic energy or flux. That feature provides an efficiency advantage over a non-ferrous frame. The frame also should be capable of withstanding high environmental temperatures, humidity, salt spray, etc.

Other features affecting the acoustic characteristics of the electro-dynamic loudspeaker include damping of undriven portions of the diaphragm film in order to help reduce distortion and smooth frequency response. Damping is required to control the edges of the diaphragm film by reducing undesired vibration.

Accordingly, designing conductors for electro-dynamic loudspeaker applications presents various challenges such as selecting the speaker with the desired audible output for a given location that will fit within the size and location constraints of the desired applications environment. Electro-dynamic loudspeakers exhibit a defined acoustical directivity pattern relative to each speaker's physical shape and the frequency of the audible output produced by each loudspeaker. Consequently, when an audio system is designed, loudspeakers possessing a desired directivity pattern over a given frequency range are selected to achieve the intended performance of the system. Different loudspeaker directivity patterns may be desirable for various loudspeaker applications. For example, for use in a consumer audio system for a home listening environment, a wide directivity may be preferred. In the application of a loudspeaker, a narrow directivity may be desirable to direct sound, e.g., voice, in a predetermined direction.

Often, space limitations in the listening environment prohibit the use of a loudspeaker in an audio system that possesses the preferred directivity pattern for the system's design. For example, the amount of space and the particular locations available in a listening environment for locating and/or mounting the loudspeakers of the audio system may prohibit the use of a particular loudspeaker that exhibits the intended directivity pattern. Also, due to space and location constraints, it may not be possible to position or oriented the desired loudspeaker in a manner consistent with the loudspeaker's directivity pattern. Consequently, size and space constraints of a particular environment may make it difficult to achieve the desired performance from the audio system. An example of a listening environment having such constraints is the interior passenger compartment of an automobile or other vehicle.

While the electric circuitry of electro-dynamic loudspeakers may present design challenges, electro-dynamic loudspeakers are very desirable loudspeakers because they are designed to have a very shallow depth. With this dimensional flexibility, electro-dynamic loudspeakers may be positioned at locations where conventional loudspeakers would not traditionally fit. This dimensional flexibility is particularly advantageous in automotive applications where positioning a loudspeaker at a location that a conventional loudspeaker would not otherwise fit could offer various advantages. Further, because the final loudspeaker assembly may be mounted on a vehicle, it is important that the assembly be rigid during shipping and handling so that the diaphragm or frame does not deform during installation.

While conventional electro-dynamic loudspeakers are shallow in depth and may therefore be preferred over conventional loudspeakers for use in environments requiring thin loudspeakers, electro-dynamic loudspeakers have a generally rectangular planar radiator that is generally relatively large in height and width to achieve acceptable operating wavelength sensitivity, power handling, maximum sound pressure level capability and low-frequency bandwidth. Unfortunately, the large rectangular size results in a high-frequency beam width angle or coverage that may be too narrow for its intended application. The high-frequency horizontal and vertical coverage of a rectangular planar radiator is directly related to its width and height in an inverse relationship. As such, large radiator dimensions exhibit narrow high-frequency coverage and vice versa.

SUMMARY

The invention provides various fixtures and related film tensioning methodologies related to electro-dynamic loudspeakers. A diaphragm is attached to a frame of an electro-dynamic loudspeaker. The frame is subsequently deformed to elongate and tension diaphragm.

Another fixture uses a film clamp to temporarily fix a diaphragm in a non-tensioned state. The diaphragm is placed in the non-tensioned state by placing the diaphragm on a vacuum source having a flat contact surface. The clamp is structured to contact the diaphragm along a perimeter portion and allow access to a center portion of the diaphragm. The clamped diaphragm is then displaced over a loudspeaker frame to produce tension in the diaphragm. Once the proper tension has been produced, the diaphragm is fixed to the frame.

Tension in a diaphragm for an electro-dynamic loudspeaker may be controlled through the use of a feedback control system. One type of feedback control system excites the diaphragm during the tensioning process. The actual resonance frequency during tensioning is compared to a target resonance frequency. Once the target resonance frequency has been reached, the tensioning process is completed. Another type of feedback system involves measuring a deflection of the diaphragm under a prescribed load. Tension in the diaphragm is varied until the actual deflection of the diaphragm matches a target deflection of the diaphragm.

A tensioning apparatus may also utilize a diaphragm having a spider with a plurality of fingers radially extending from a hub where each of the fingers includes a pad adapted to contact one side of the diaphragm while a base plate contacts an opposite side of the diaphragm. An axial force is placed upon the spider. The axial force is at least partially converted to a lateral force in the diaphragm to produce a tension in the diaphragm between the pads.

Also, a diaphragm may be tensioned by placing the diaphragm between a first plate and a second plate where each of the plates includes an aperture extending through its thickness and an annular groove circumscribing the aperture. The first and second plates are drawn toward one another to tension the film. The electro-dynamic loudspeaker frame is coupled to the diaphragm while tension is maintained in the diaphragm.

Also, a diaphragm may be tensioned by elastically deforming a frame of the electro-dynamic loudspeaker and coupling a diaphragm to the frame while the load is maintained on the frame. The load on the frame is released to tension the diaphragm.

The electro-dynamic loudspeaker assembly system may include a frame loading station, an adhesive application station, a magnet placing station, a curing station, a magnetization station, a diaphragm adhesive application station, a diaphragm placing station, an edge treatment application station, a film tensioning and adhesive curing station, an electrical terminal installation station, a diaphragm cutting station, a clamp repositioning station and an acoustical testing station.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
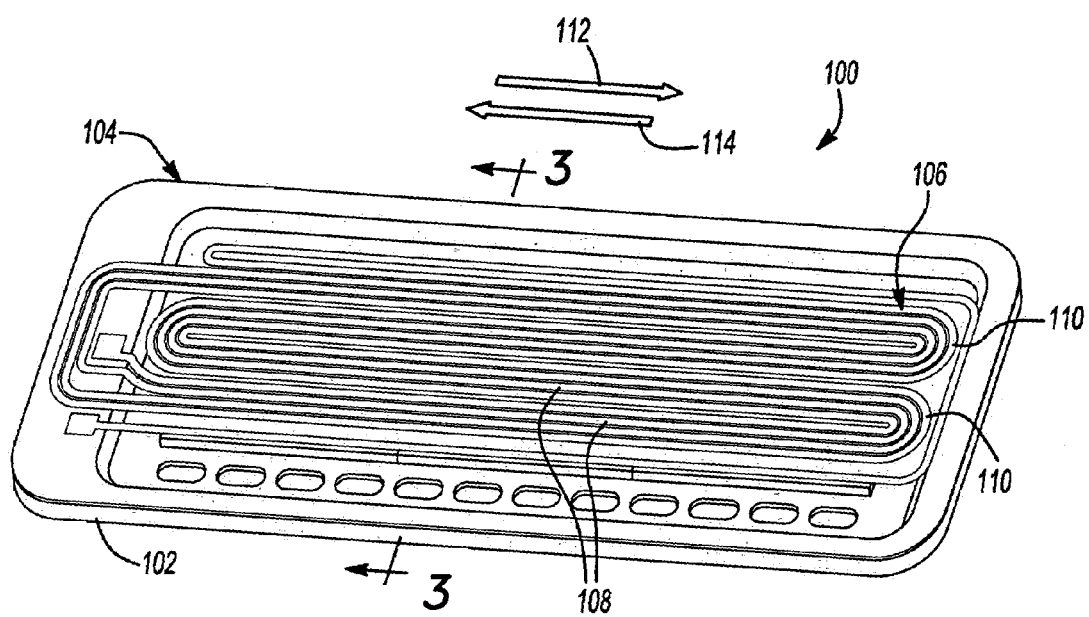
FIG. 1 is a perspective view of an electro-dynamic loudspeaker as it would appear with the grille removed.

FIG. 1 is a perspective view of an electro-dynamic loudspeaker 100 of the invention. As shown in FIG. 1, the electro-dynamic loudspeaker is a generally planar loudspeaker having a frame 102 with a diaphragm 104 attached in tension to the frame 102. A conductor 106 is positioned on the diaphragm 104. The conductor 106 is shaped in serpentine fashion having a plurality of substantially linear sections (or traces) 108 longitudinally extending along the diaphragm interconnected by radii 110 to form a single current path. Permanent magnets 202 (shown in FIG. 2) are positioned on the frame 102 underneath the diaphragm 104, creating a magnetic field.

Linear sections 108 are positioned within the flux fields generated by permanent magnets 202. The linear sections 108 carry current in a first direction 112 and are positioned within magnetic flux fields having similar directional polarization. Linear sections 108 of conductor 106 having current flowing in a second direction 114, that is opposite the first direction 112, are placed within magnetic flux fields having an opposite directional polarization. Positioning the linear sections 108 in this manner assures that a driving force is generated by the interaction between the magnetic fields developed by magnets 202 and the magnetic fields developed by current flowing in conductor 106. As such, an electrical input signal traveling through the conductor 106 causes the diaphragm 104 to move, thereby producing an acoustical output.

Figure 2:
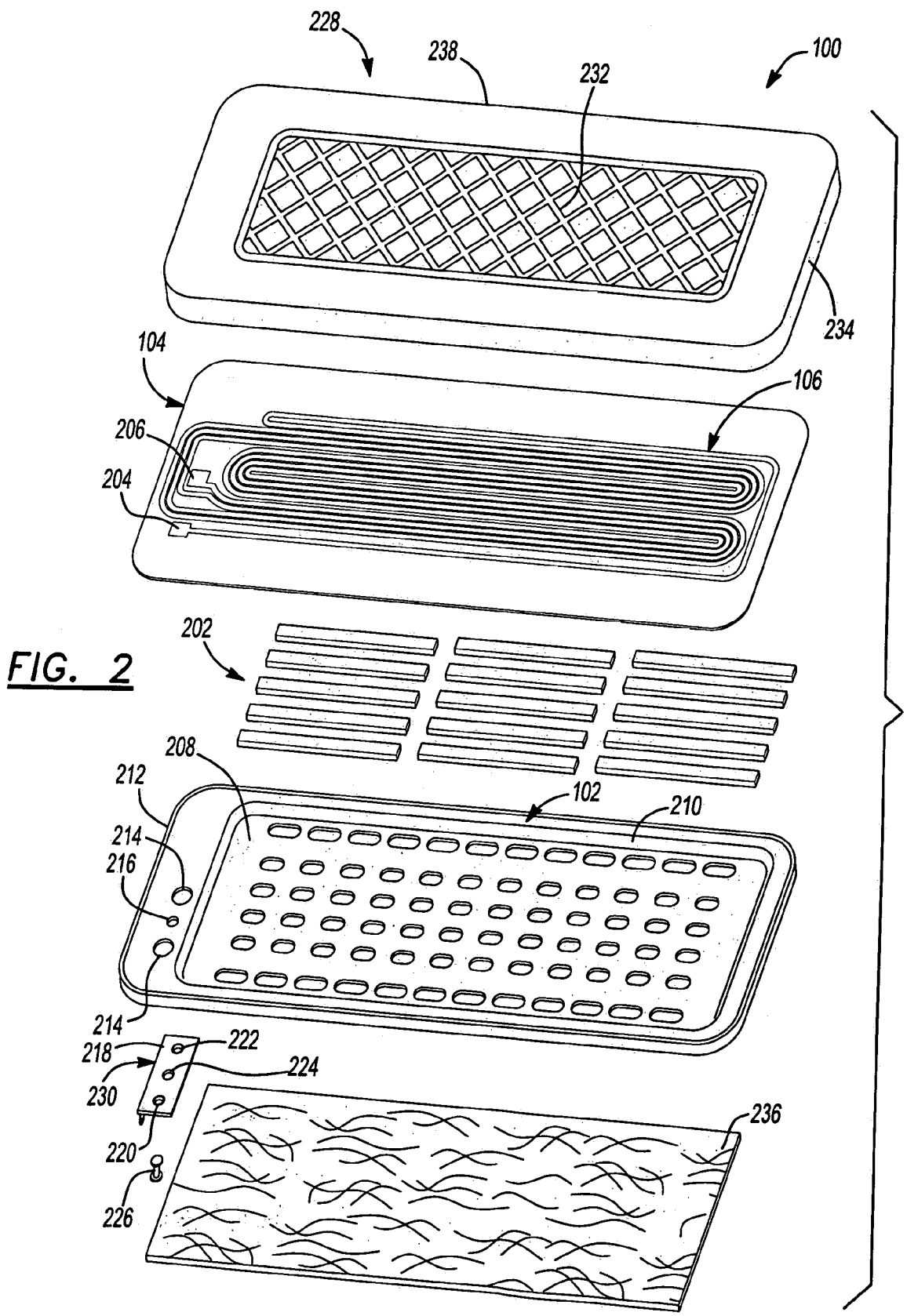
FIG. 2 is an exploded perspective view of the electro-dynamic loudspeaker shown in FIG. 1 having a grille.

FIG. 2 is an exploded perspective view of the electro-dynamic loudspeaker 100 shown in FIG. 1. As illustrated in FIG. 2, the flat panel loudspeaker 100 includes a frame 102, a plurality of high energy magnets 202, a diaphragm 104, an acoustical dampener 236 and a grille 228. Frame 102 provides a structure for fixing magnets 202 in a predetermined relationship to one another. In the depicted embodiment, magnets 202 are positioned to define five rows of magnets 202 with three magnets 202 in each row. The rows are arranged with alternating polarity such that fields of magnetic flux are created between each row. Once the flux fields have been defined, diaphragm 104 is fixed to frame 102 along its periphery.

A conductor 106 is coupled to the diaphragm 104. The conductor 106 is generally formed as an aluminum foil bonded to the diaphragm 104. The conductor 106 can, however, be formed from other conductive materials. The conductor 106 has a first end 204 and a second end 206 positioned adjacent to one another at one end of the diaphragm 104.

As shown in FIG. 2, frame 102 is a generally dish-shaped member preferably constructed from a substantially planar contiguous steel sheet. The frame 102 includes a base plate 208 surrounded by a wall 210. The wall 210 terminates at a radially extending flange 212. The frame 102 further includes apertures 214 and 216 extending through flange 212 to provide clearance and mounting provisions for a conductor assembly 230.

Conductor assembly 230 includes a terminal board 218, a first terminal 220 and a second terminal 222. Terminal board 218 includes a mounting aperture 224 and is preferably constructed from an electrically insulating material such as plastic, fiberglass or other insulating material. A pair of rivets or other connectors (not shown) pass through apertures 214 to electrically couple first terminal 220 to first end 204 and second terminal 222 to second end 206 of conductor 106. A fastener such as a rivet 226 extends through apertures 224 and 216 to couple conductor assembly 230 to frame 102.

A grille 228 functions to protect diaphragm 104 from contact with objects inside the listening environment while also providing a method for mounting loudspeaker 100. The grille 228 has a substantially planar body 238 having a plurality of apertures 232 extending through the central portion of the planar body 238. A rim 234 extends downward, substantially orthogonally from body 238, along its perimeter and is designed to engage the frame 102 to couple the grille 228 to the frame 102.

An acoustical dampener 236 is mounted on the underside of the base plate 208 of the frame 102. Dampener 236 serves to dissipate acoustical energy generated by diaphragm 104 thereby minimizing undesirable amplitude peaks during operation. The dampener 236 may be made of felt, or a similar gas permeable material.

Figure 3:
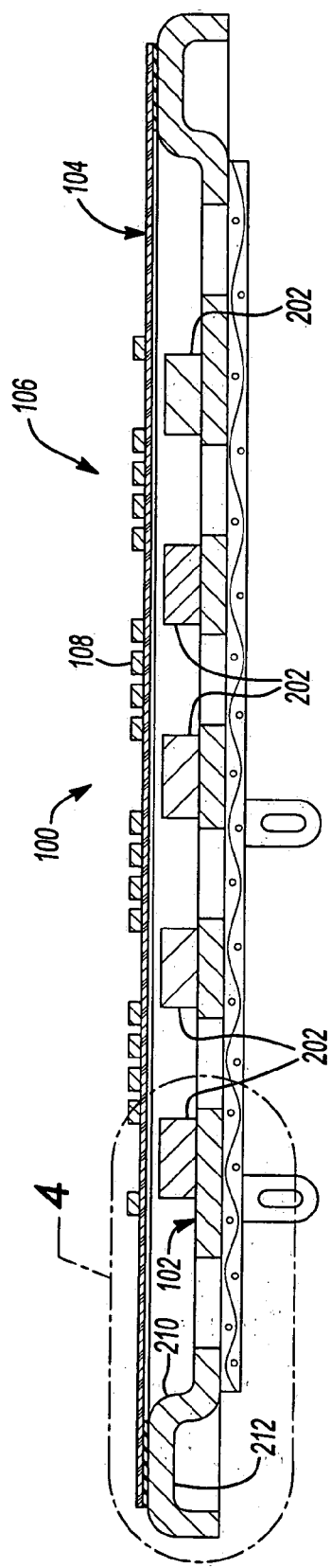
FIG. 3 is a cross-sectional view of the electro-dynamic loudspeaker taken along line 3-3 of FIG. 1.

FIG. 3 is a cross-sectional view of the electro-dynamic loudspeaker taken along line 3-3 of FIG. 1. FIG. 3 shows the frame 102 having the diaphragm 104 attached in tension to the frame 102 and the permanent magnets 202 positioned on the frame 102 underneath the diaphragm 104. Linear sections 108 of the conductor 106 are also shown positioned on top of the diaphragm 104.

Figure 4:
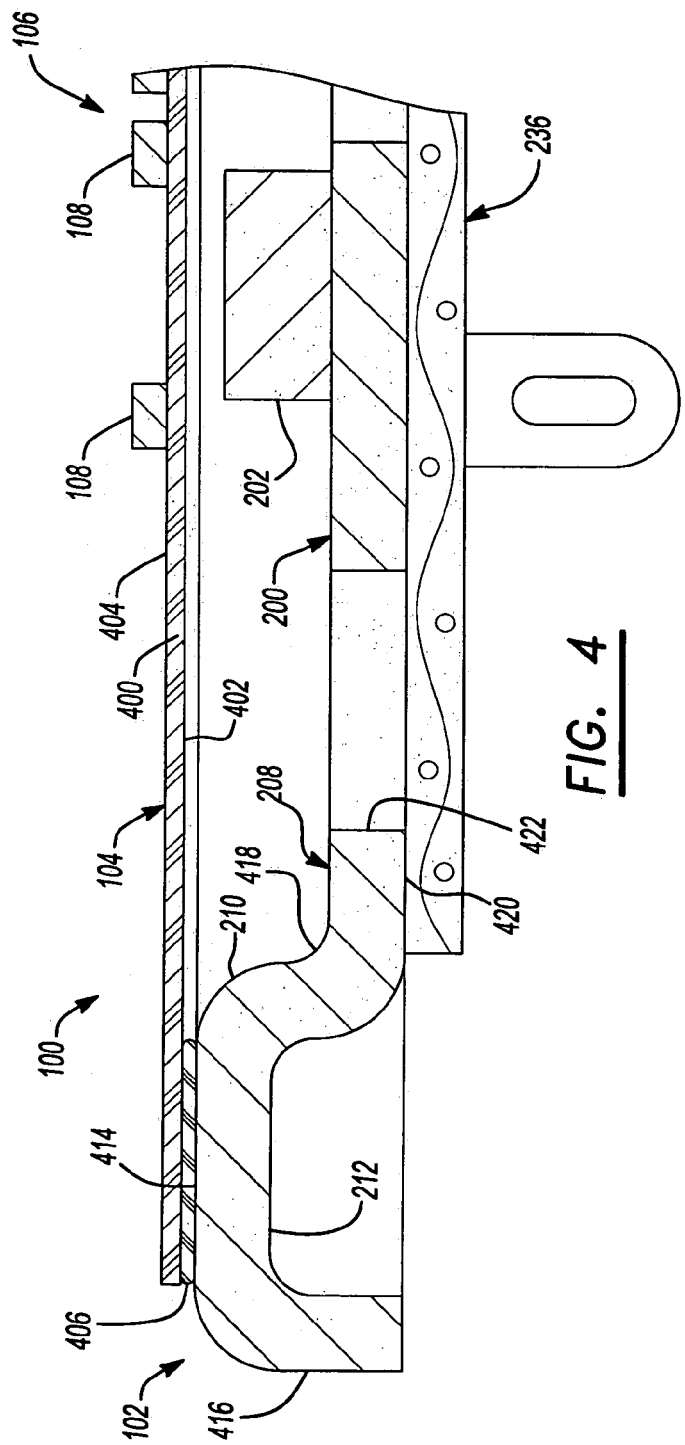
FIG. 4 is an enlarged cross-sectional view of the encircled area of FIG. 3.

FIG. 4 is an enlarged cross-sectional view of the encircled area of FIG. 3. As illustrated by FIG. 4, the diaphragm 104 is comprised of a thin film 400 having a first side 402 and a second side 404. First side 402 is coupled to frame 102. Generally, the diaphragm 104 is secured to the frame 102 by an adhesive 406 that is curable by exposure to radiation. However, the diaphragm 104 may secured to the frame 102 by other mechanism, such as those known in the art.

To provide a movable membrane capable of producing sound, the diaphragm 104 is mounted to the frame in a state of tension and spaced apart a predetermined distance from magnets 202. The magnitude of tension of the diaphragm 104 depends on the speaker's physical dimensions, materials used to construct the diaphragm 104 and the strength of the magnetic field generated by magnets 202. Magnets 202 are generally constructed from a highly energizable material such as neodymium iron boron (NdFeB), but may be made of other magnetic materials. The thin diaphragm film 400 is generally a polyethylenenaphthalate sheet having a thickness of approximately 0.001 inches; however, the diaphragm film 400 may be formed from materials such as polyester (e.g., known by the tradename "Mylar"), polyamide (e.g., known by the tradename "Kapton") and polycarbonate (e.g., known by the tradename "Lexan"), and other materials known by those skilled in the art for forming diaphragms 104.

The conductor 106 is coupled to the second side 404 of the diaphragm film 400. The conductor 106 is generally formed as an aluminum foil bonded to diaphragm film 400, but may be formed of other conductive material known by those skilled in the art.

The frame 102 includes a base plate 208 surrounded by a wall 210 extending generally orthogonally upward from the plate 208. The wall 210 terminates at a radially extending flange 212 that defines a substantially planar mounting surface 414. A lip 416 extends downwardly from flange 212 in a direction substantially parallel to wall 210. Base plate 208 includes a first surface 418, a second surface 420 and a plurality of apertures 422 extending through the base plate 208. The apertures 422 are positioned and sized to provide air passageways between the first side 402 of diaphragm 104 and first surface 418 of frame 102. An acoustical dampener 236 is mounted to second surface 420 of frame base plate 208.

Figure 5:
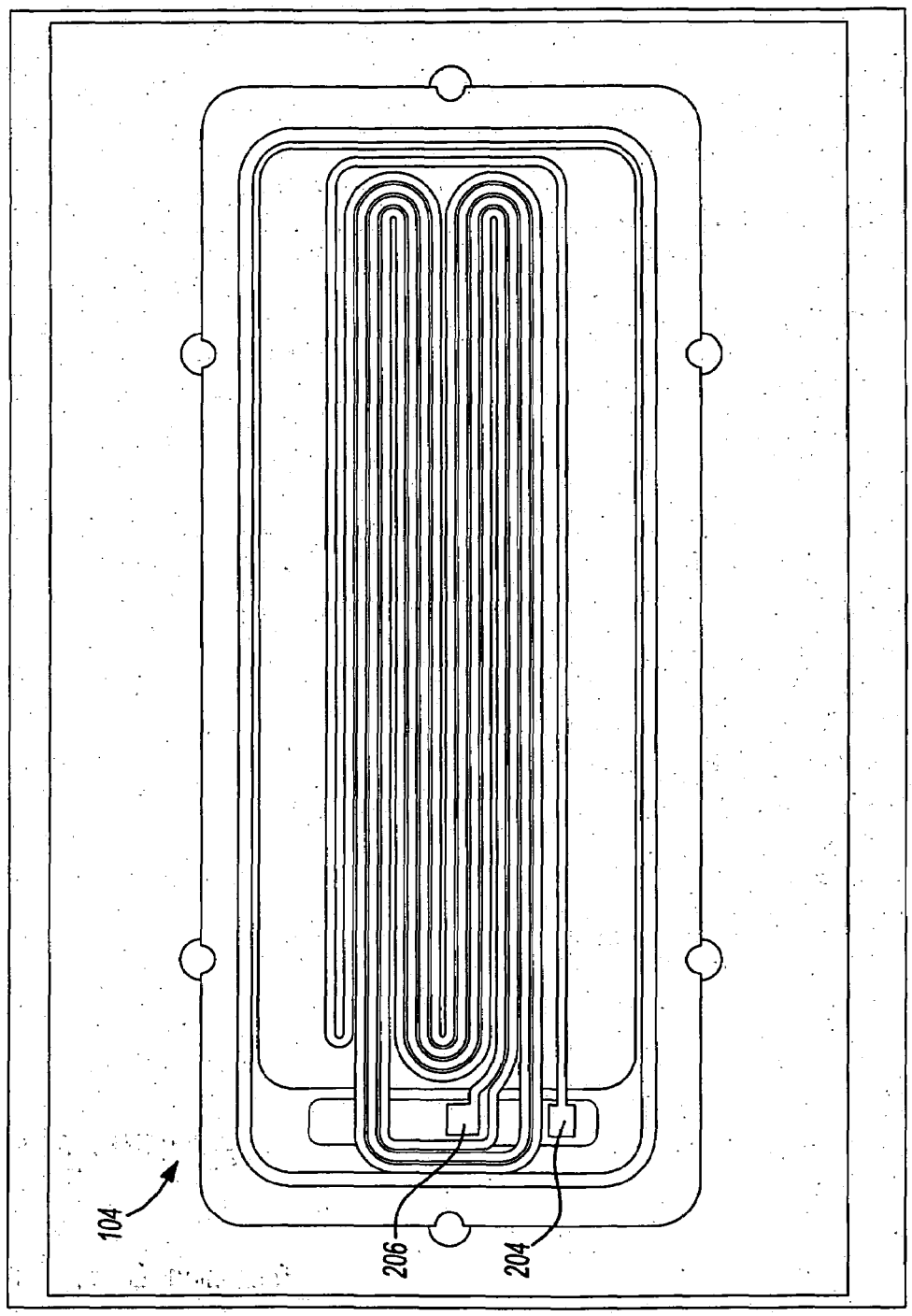
FIG. 5 is a plan view showing a conductor on a diaphragm of an electrodynamic loudspeaker.
Figure 6:
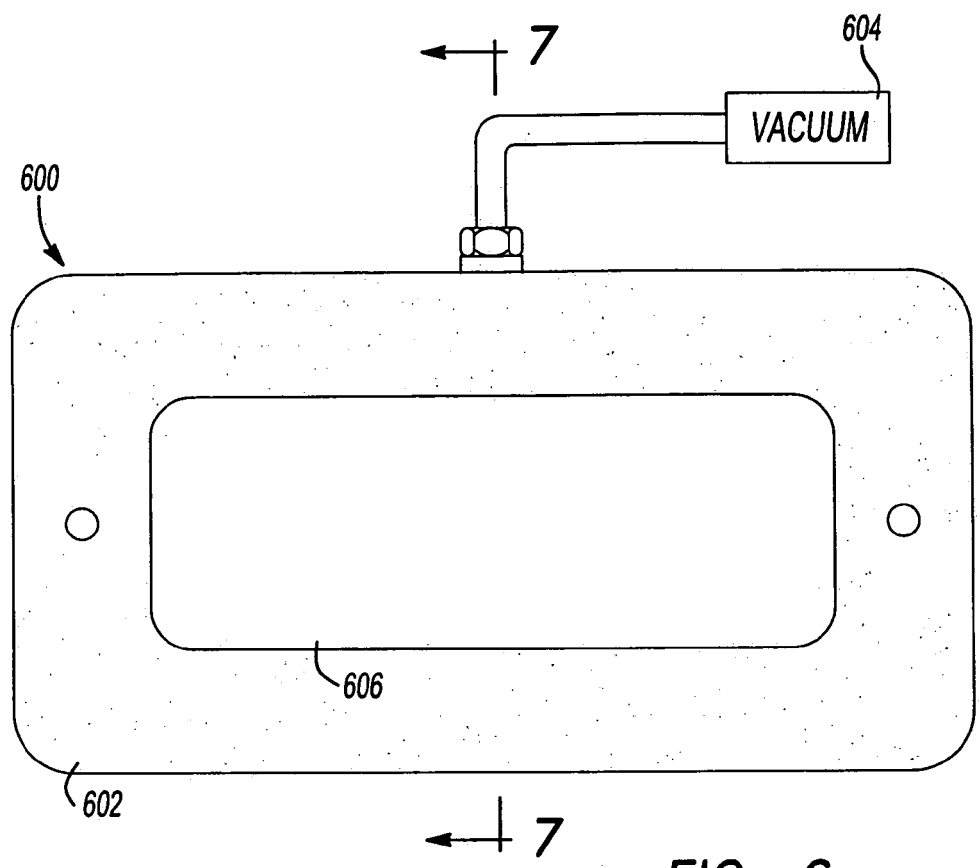
FIG. 6 is a plan view of a vacuum platen for use in constructing an electrodynamic loudspeaker.
Figure 7:
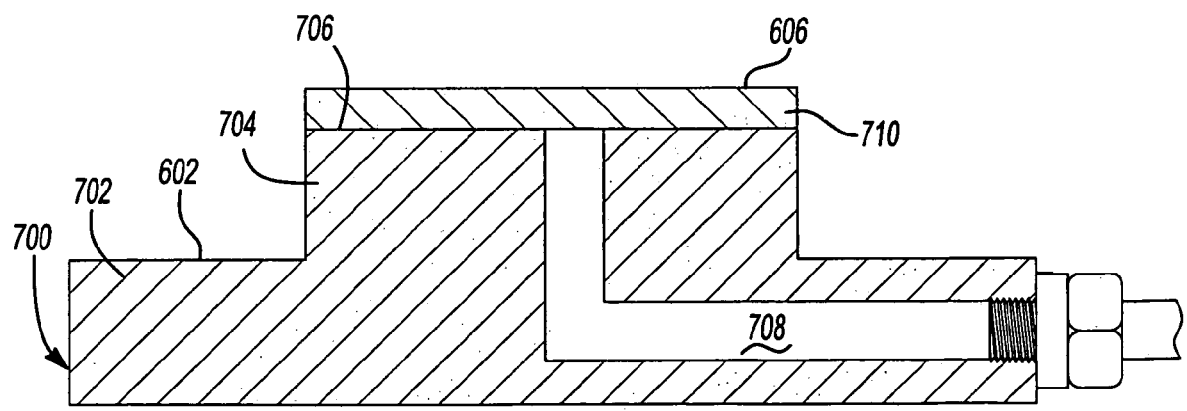
FIG. 7 is a cross-sectional side view of the vacuum platen shown in FIG. 6.
Figure 8:
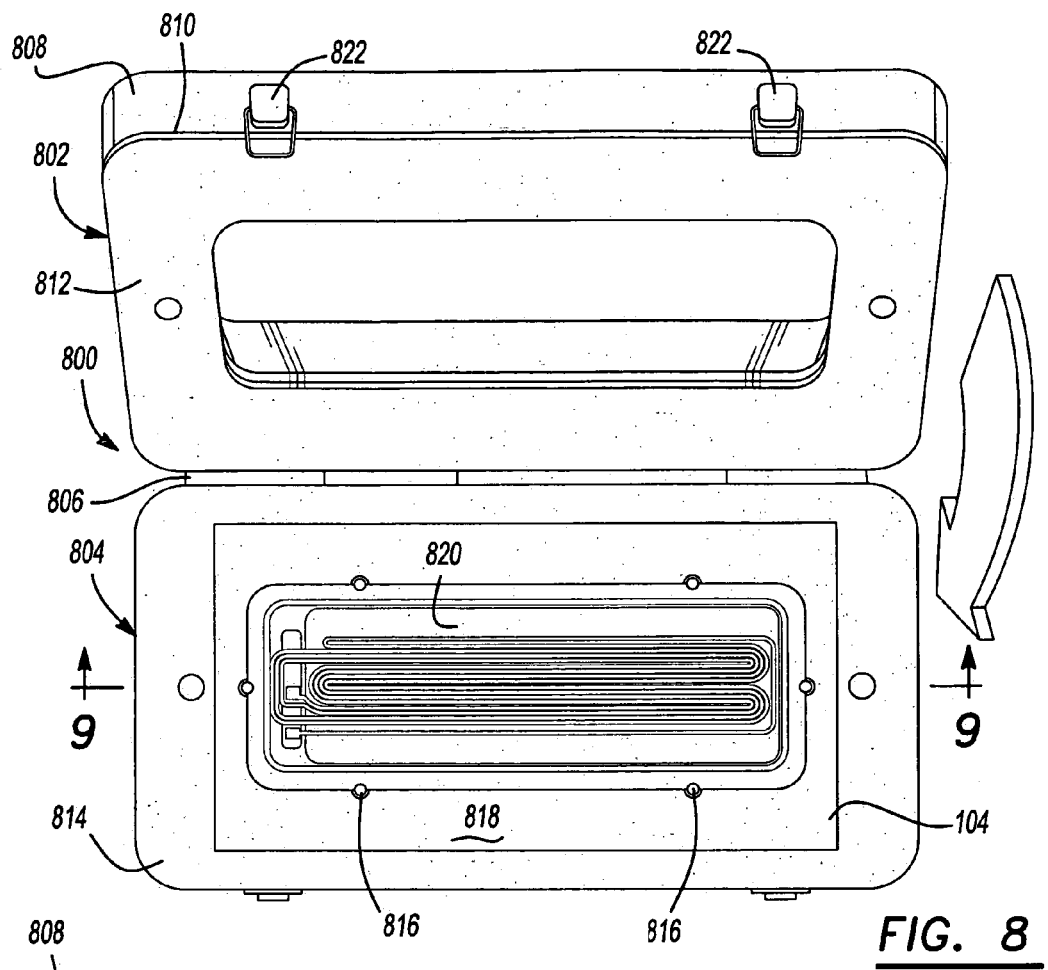
FIG. 8 is a perspective view of a clamp assembly for use in constructing of an electro-dynamic loudspeaker.
Figure 9:
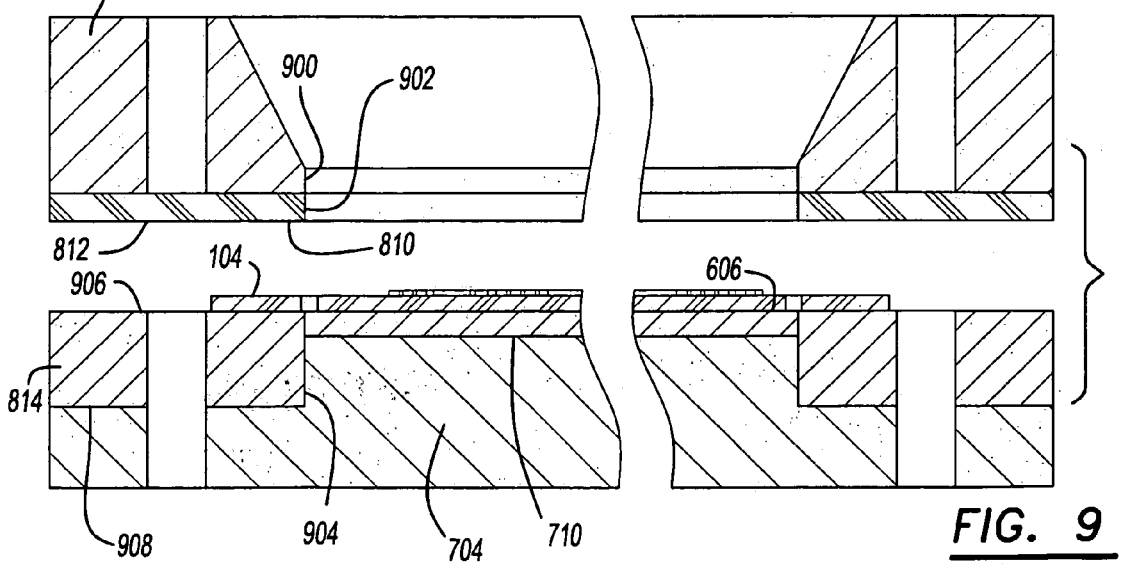
FIG. 9 is a cross-sectional side view of the clamp assembly of FIG. 8.

Various systems for assembling an example loudspeaker 100 will now be described. A first example system is depicted in FIGS. 5-17. The first system includes a vacuum platen 600 (FIGS. 6-7) and a film clamp 800 (FIGS. 8-9). Vacuum platen 600 and film clamp 800 may be used in conjunction with one another to restrain diaphragm 104 (FIG. 5) in a flat position without tension. Once diaphragm 104 is fixed within clamp 800, film 400 may be subsequently tensioned as will be described later.

The initial flattening and clamping of diaphragm 104 may provide the assembler with a known diaphragm state to which tension may be added. Difficulties may arise in attempting to obtain a reproducible tension during subsequent assembly operations when diaphragm 104 is not first placed in a substantially flat, no tension state. This first example system includes vacuum platen 600 and film clamp 800 to achieve a repeatable diaphragm state. In other examples, any other mechanism(s) and/or techniques capable of providing a known diaphragm state to which tension may be added may be used.

The example vacuum platen 600 includes a base 700 having a body 702 and a pedestal 704 protruding from a first surface 602 of body 702. Pedestal 704 includes an upper surface 706 positioned substantially parallel to first surface 602. A vacuum passageway 708 may extend through pedestal 704 and body 702 to couple upper surface 706 with a vacuum source 604. A cap 710 may be coupled to pedestal 704 along upper surface 706. Cap 710 may be constructed from a gas permeable material such as porous aluminum. Base 700 may be constructed from a gas impermeable material. Accordingly, a suction force is created along an upper surface 606 of cap 710 when vacuum source 604 draws a vacuum in vacuum passageway 708.

The example film clamp 800 includes an upper clamp half 802 and a lower clamp half 804 connected by a hinge 806. The illustrated upper clamp half 802 includes a generally rectangularly shaped body 808 and an elastomeric gasket 810. Body 808 includes an aperture 900 (FIG. 9) extending through body 808. Elastomeric gasket 810 includes a similarly shaped aperture 902 (FIG. 9) extending through the thickness of gasket 810. Elastomeric gasket 810 may be attached to body 808 to provide a compressible high friction surface 812 for engagement with diaphragm 104.

The illustrated lower clamp half 804 is constructed from a generally rectangularly shaped aluminum frame 814 having an aperture 904 extending through the lower clamp half 804. Lower clamp half 804 includes an upper surface 906 and a lower surface 908.

During the loudspeaker assembly process, film clamp 800 may be positioned on vacuum platen 600 such that pedestal 704 enters aperture 904 of lower clamp half 804 as illustrated in FIG. 9. Once seated, upper surface 906 of lower clamp half 804 may be substantially coplanar with upper surface 606 of cap 710. In order to properly position diaphragm 104, upper clamp half 802 may be rotated to place film clamp 800 in the open position depicted in FIG. 8.

With vacuum source 604 turned off, diaphragm 104 may be placed on upper surface 606. Diaphragm 104 may be aligned relative to lower clamp half 804 using sights 816. Sights 816 may be visual markings, rods, rings, notches or any other form of alignment mechanism formed on diaphragm 104 to assist in the alignment procedure. The location of sights 816 effectively defines a perimeter portion 818 and a center portion 820 of diaphragm 104. Center portion 820 may contain most, if not all, of the material which will remain coupled to frame 102 at the completion of the assembly process.

Figure 10:
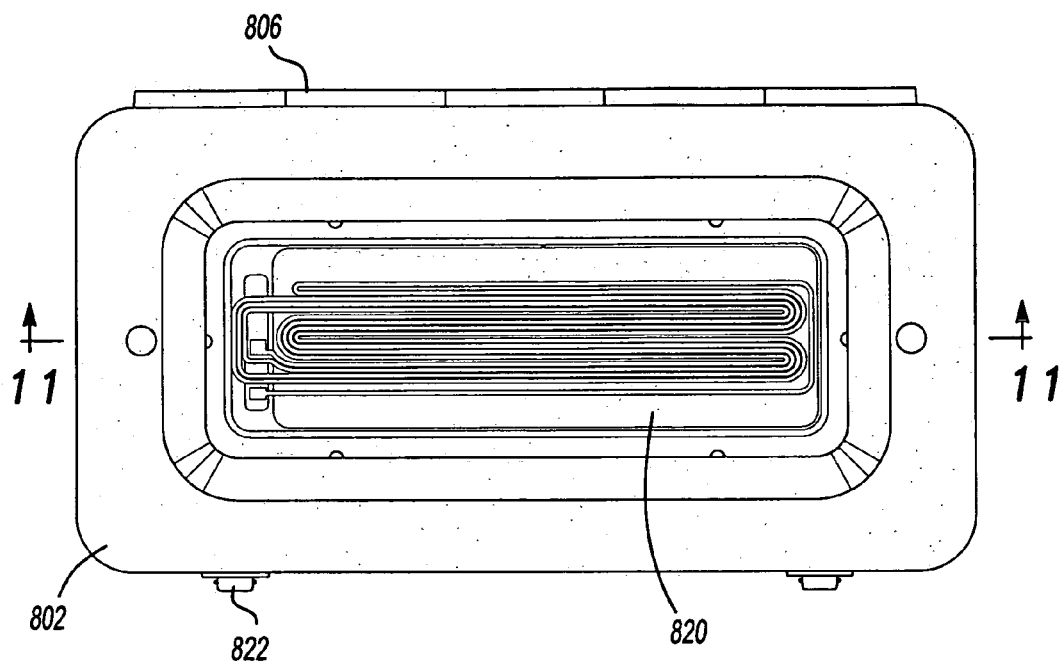
FIG. 10 is a plan view of the clamp assembly in a closed position.
Figure 11:
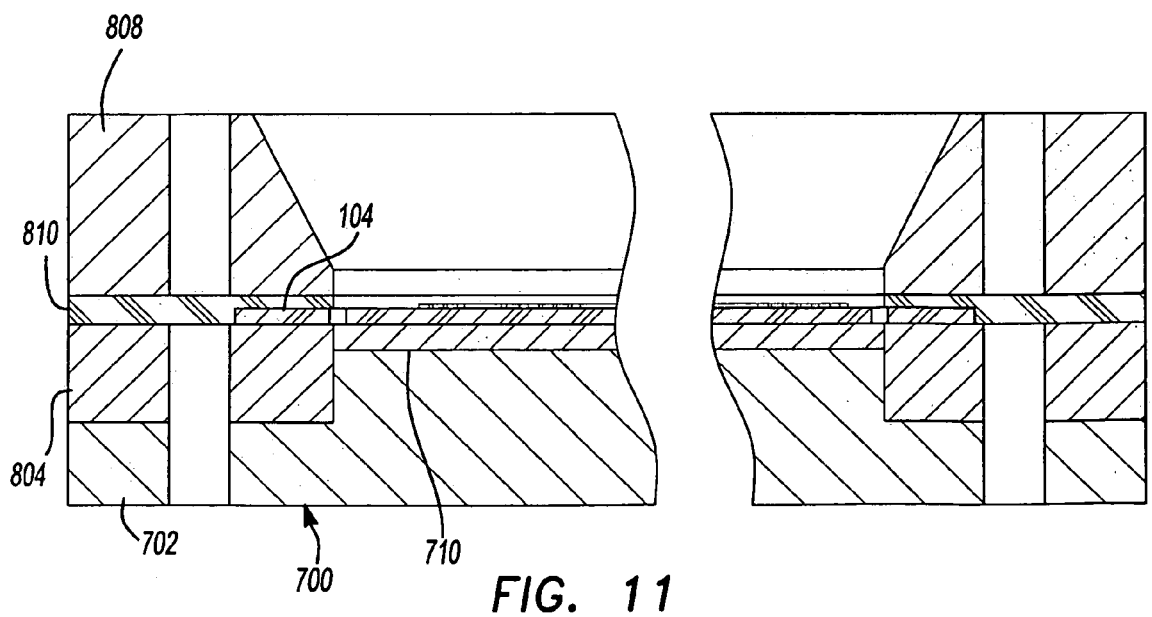
FIG. 11 is a cross-sectional side view of the clamp assembly in the closed position.

Once diaphragm 104 has been properly positioned, vacuum may be supplied to cap 710 via vacuum source 604. Because cap 710 is constructed from a gas permeable material, diaphragm 104 is forced to closely conform to planar upper surface 606. While the vacuum source is maintained, upper clamp half 802 may be rotated to place film clamp 800 in a closed position as shown in FIGS. 10 and 11. During clamp closure, elastomeric gasket 810 may deform locally to account for the thickness of diaphragm 104. Latches 822 secure upper clamp half 802 to lower clamp half 804. It should be appreciated that latches 822 are merely exemplary devices for coupling the clamp halves together and that any number of fastening devices may be implemented. Once upper clamp half 802 is clamped to lower clamp half 804, vacuum is turned off and film clamp 800 holding diaphragm 104 in an untensioned state is removed from vacuum platen 600.

Figure 12:
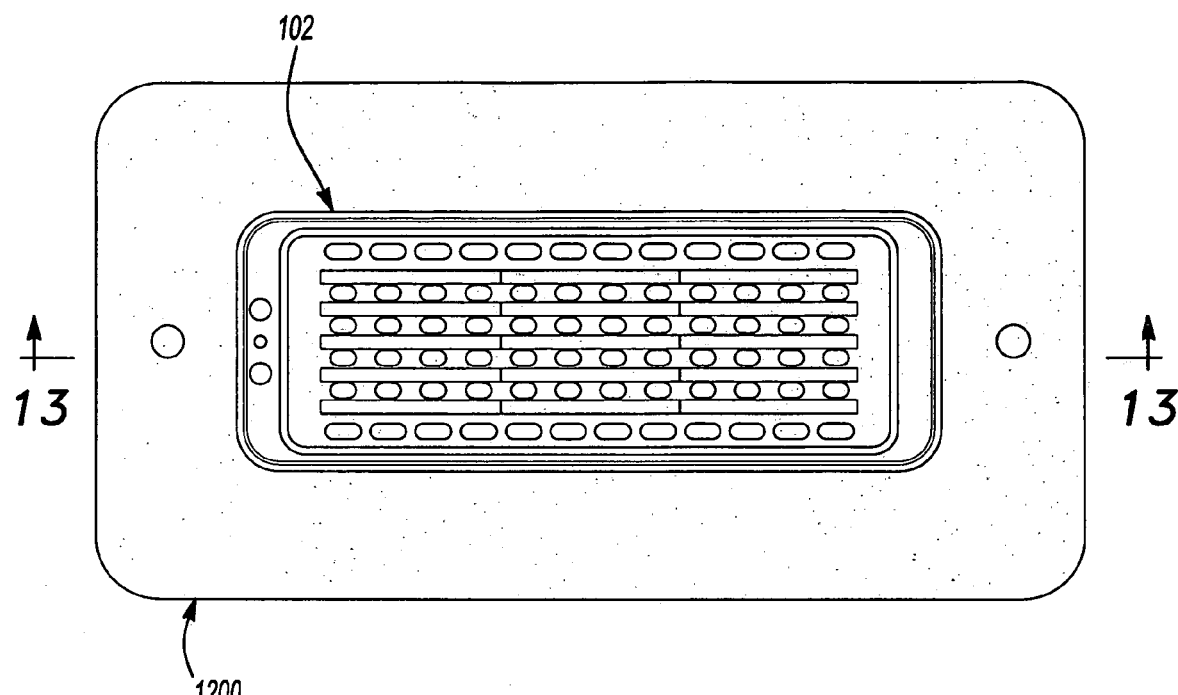
FIG. 12 is a plan view of an assembly fixture for assembling an electrodynamic loudspeaker.
Figure 13:
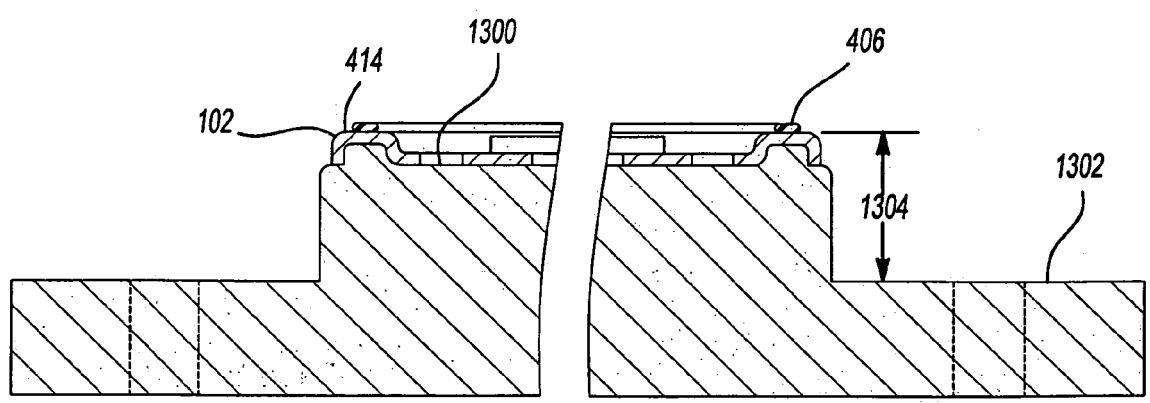
FIG. 13 is a cross-sectional side view of the assembly fixture.

Frame 102 may be fixtured in an example assembly fixture 1200 (FIGS. 12 and 13). Assembly fixture 1200 may be shaped substantially similarly to vacuum platen 600. However, assembly fixture 1200 may include a recess 1300 for receipt of a portion of frame 102. Assembly fixture 1200 includes a gage surface 1302 offset a predetermined distance 1304 from planar mounting surface 408 of frame 102. In order to apply tension to diaphragm 104, distance 1304 is greater than the thickness of lower clamp half 804. The magnitude of tension generated is optimized by defining distance 1304 in concert with the physical characteristics of frame 102 and diaphragm 104.

Figure 14:
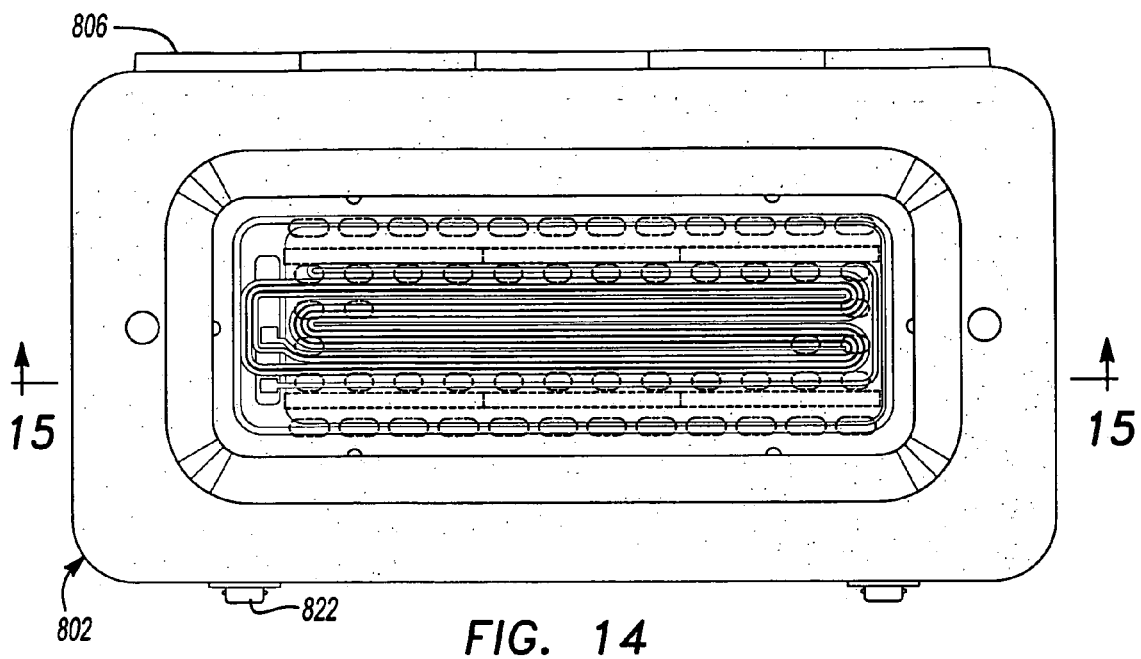
FIG. 14 is a plan view of the clamp assembly positioned atop the assembly fixture.
Figure 15:
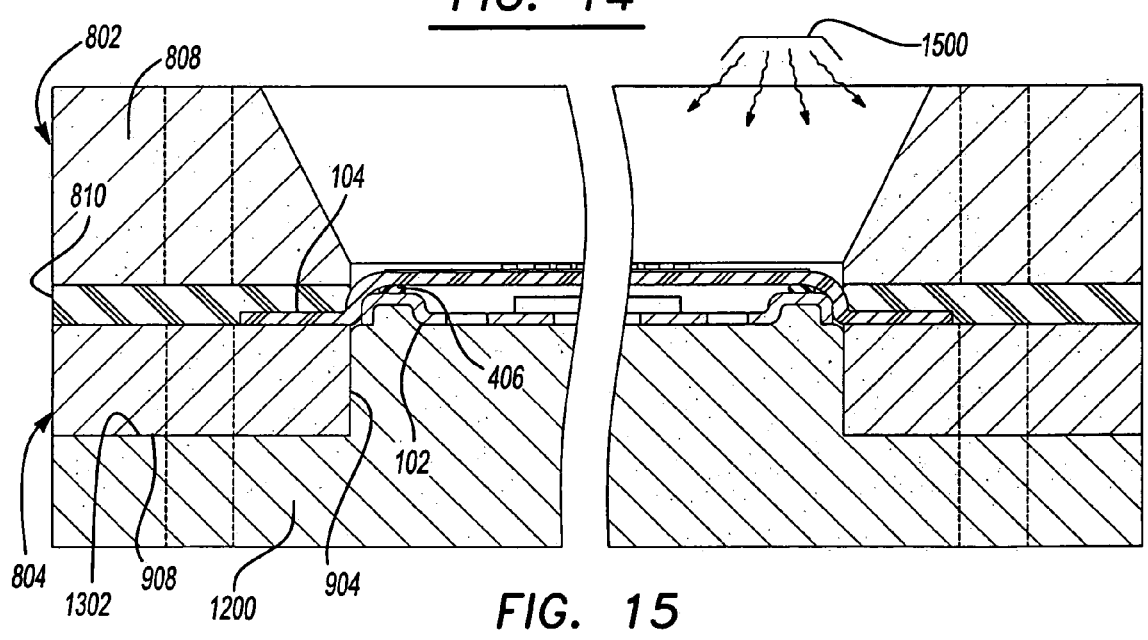
FIG. 15 is a cross-sectional side view of the closed clamp assembly positioned atop the assembly fixture.

Diaphragm 104 may be mechanically coupled with frame 102. For example, adhesive 406 may be applied to planar mounting surface 408 of frame 102. Adhesive 406 may alternatively be applied to diaphragm 104. After application of adhesive 406, film clamp 800 including clamped diaphragm 104 may be positioned on assembly fixture 1200 such that frame 102 enters aperture 904 of lower clamp half 804 (FIGS. 14 and 15). The diaphragm 104 may contact adhesive 406 and planar mounting surface 408 of frame 102. Contact may occur prior to lower surface 908 of lower clamp half 804 contacting gage surface 1302 of assembly fixture 1200. To produce the desired tension in film 400, film clamp 800 is forced down over assembly fixture 1200 so that lower surface 908 engages gage surface 1302.

Depending on the type of adhesive used, a subsequent process may be required. For example, adhesive 406 is curable by exposure to radiation. Accordingly, while film clamp 800 is coupled to assembly fixture 1200, a radiation source 1500 is energized to cure the adhesive and secure diaphragm 104 to frame 102. Alternatively, where some other mechanical coupling mechanism is used, appropriate processes may need to be performed.

Figure 16:
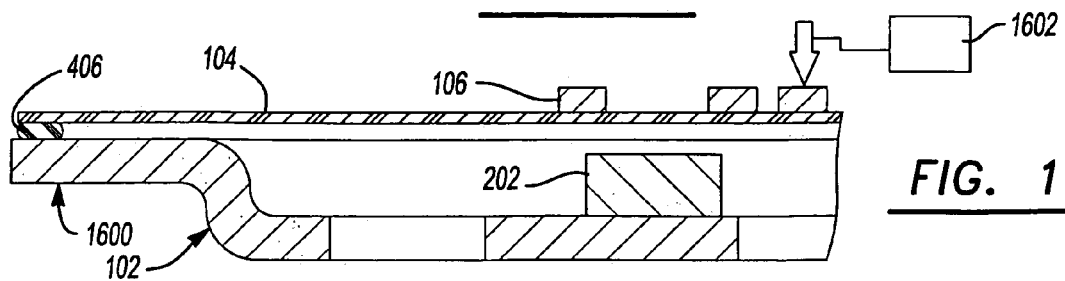
FIG. 16 is cross-sectional side view of a work-in-process electro-dynamic loudspeaker.

A second example system used to tension the diaphragm of a loudspeaker 100 is described with reference to FIGS. 16 and 17. In this system, frame 102 includes an elongated radially extending flange 1600 which does not include a downwardly extending lip. The remaining planar loudspeaker components are substantially similar to those previously described. The assembly process may include positioning diaphragm 104 in a substantially flat, no tension state as previously described. However, it should be appreciated that the flattening and clamping steps are not necessarily required to construct planar loudspeaker according to this system. Similarly, alternate tensioning methods that are described are not intended to be limited to include the flattening and clamping process.

A bead of adhesive 406 may be applied along the periphery of either or both frame 102 and diaphragm 104. Diaphragm 104 may then be aligned with and bonded to frame 102 via adhesive 406. As noted earlier, adhesive 406 may be a light curable material or any other suitable bonding agent which may affix the dissimilar materials to one another. Similarly, adhesive 406 may any other coupling mechanism to mechanically couple the diaphragm 104 to the frame 102.

Figure 17:
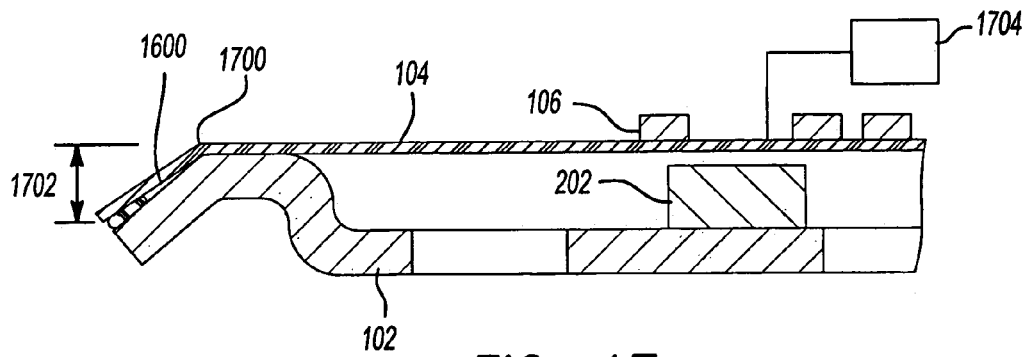
FIG. 17 is a cross-sectional side view of a finished electro-dynamic loudspeaker.

Radially extending flange 1600 may be mechanically deformed by bending an outer peripheral region down from line 1700 as shown in FIG. 17 to tension diaphragm 104. Line 1700 acts as a fulcrum around the perimeter of frame 102 about which diaphragm 104 is stretched. The proper diaphragm tension may be obtained in a variety of ways. For example, if diaphragm 104 was initially coupled to frame 102 in a substantially flat, non-tension state, a deflection distance 1702 may be empirically determined by testing. Once the proper deflection distance is determined, hard tooling may be created to repeatably deform frame 102 and move radially extending flange 1600 the predetermined deflection distance 1702 during the assembly of each loudspeaker 100.

Another example system of assuring proper film tension includes a feedback system 1602. One example feedback system may involve placing a known load at the center of diaphragm 104 and measuring the deflection of the diaphragm at the load application point. The desired deflection per load may be empirically determined by testing where the resonance frequency of diaphragm 104 is plotted against deflection per a given load. Once the desired resonance frequency is determined for a given speaker geometry, a target diaphragm deflection per given load may be determined. The feedback system may operate by measuring the actual diaphragm deflection at a known load with a deflection sensor 1604. The measured actual deflection may be compared to the target deflection.

Frame 102 may be deformed until the measured deflection is substantially equal to the target deflection, thereby properly tensioning diaphragm 104 to produce the desired resonance frequency. Logic control systems such as proportional, integral, derivative closed feedback loops, etc. may be implemented to control the mechanical deflection of frame 102 during the tensioning process. Such a control system may provide a high degree of repeatability regarding film tensioning.

Another example feedback system 1704 may directly measure resonance frequency during film tensioning using a frequency sensor 1706. In this control scheme, diaphragm 104 may be repeatedly excited and the resonance frequency measured. The measured frequency may be compared to a desired target frequency during film tensioning. Frame 102 may be deformed until the measured resonance frequency matches the target frequency within an acceptable tolerance. It should be appreciated that the feedback systems described may be used with any of the tensioning techniques described.

Yet another film tensioning system will be described in greater detail with reference to FIG. 18. An example film tensioner 1800 includes an upper plate 1802 and a lower plate 1804. Plates 1802 and 1804 have matching beveled apertures 1806 and 1808, respectively. Center portion 820 of diaphragm 104 is positioned within the openings defined by apertures 1806 and 1808. Apertures 1806 and 1808 may be sized and shaped slightly larger than frame 102 to allow insertion of frame 102 within one of the apertures 1806 and 1808.

Figure 18:
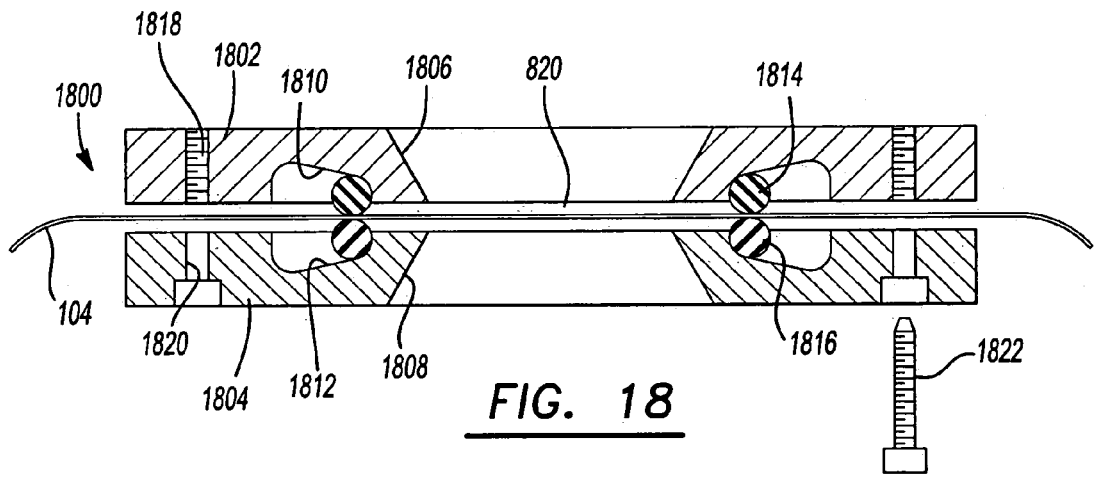
FIG. 18 is a cross-sectional view of a film tensioning device constructed in accordance with the teachings of the invention.

Upper plate 1802 may include an annular groove 1810 having an asymmetrical cross-section as shown in FIG. 18. Lower plate 1804 may include an annular groove 1812 shaped as the mirror image of groove 1810. A first elastomeric member 1814 may be positioned within groove 1810 and a second elastomeric member 1816 may be positioned within groove 1812. Grooves 1810 and 1812 may be shaped to constrain movement of the elastomeric members 1814 and 1816 toward apertures 1806 and 1808, respectively. In addition, grooves 1810 and 1812 may be shaped to allow movement of elastomeric members 1814 and 1816 away from apertures 1806 and 1808. Specifically, the annular grooves 1810 and 1812 may be shaped to impart a lateral force to center portion 820 of diaphragm 104 when an axial force is applied to upper plate 1802 and lower plate 1804 drawing them toward one another.

Upper plate 1802 may also include threaded apertures 1818. Stepped apertures 1820 extend through lower plate 1804. Threaded fasteners 1822, which are illustrated as bolts, may be inserted in apertures 1820 and tightened into threaded apertures 1818 to draw upper plate 1802 and lower plate 1804 together. It should be appreciated that upper plate 1802 and lower plate 1804 may be drawn together using a variety of mechanisms such as toggle clamps, jack screws, hydraulic cylinders or any other known clamping and force producing devices.

In this example technique, the film may first be tensioned by drawing upper plate 1802 and lower plate 1804 together. Adhesive 406 (or some other coupling mechanism) may be placed on the tensioned portion of diaphragm 104 and/or planar mounting surface 408 of frame 102. While upper plate 1802 is clamped to lower plate 1804, frame 102 may be placed into contact with diaphragm 104. Once the adhesive has cured (or mechanical coupling completed), the threaded fasteners 1822 may be removed and upper plate 1802 may be separated from lower plate 1804. It should also be appreciated that apertures 1806 and 1808 may be sized to allow entry of light waves to cure adhesive 406, or to allow manipulation of some other coupling mechanism, if so desired. Depending on the specific configuration of the loudspeaker 100, perimeter portion 818 of diaphragm 104 may be trimmed to remove any film extending beyond lip 306.

Figure 19:
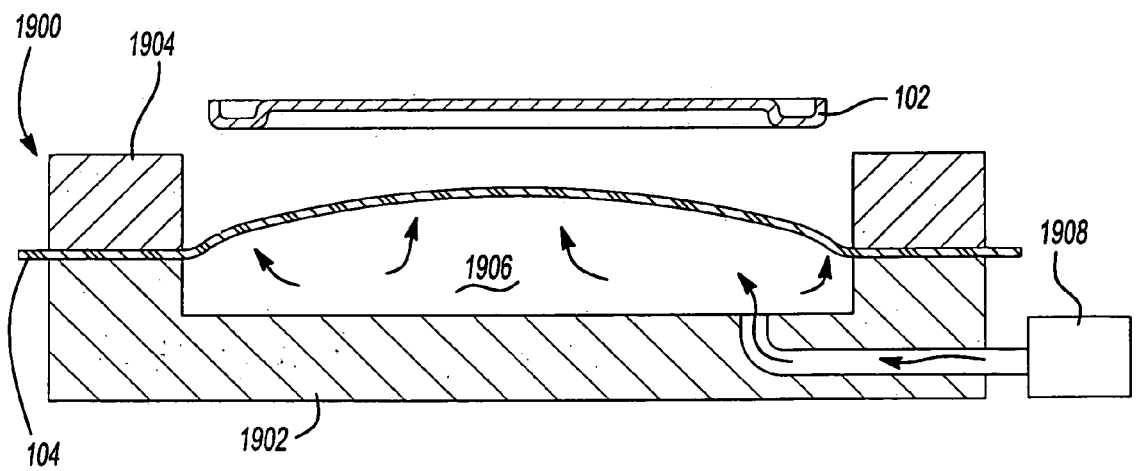
FIG. 19 is a cross-sectional side view of an alternate film tensioning device.

With reference to FIG. 19, another example film tensioning technique is depicted. The fixturing used to practice this example technique includes a fixture 1900 having a lower die 1902, and an upper die 1904. Fixture 1900 may function to restrain the periphery of diaphragm 104 and define a cavity 1906 between one side of the diaphragm 104 and lower die 1902. A fluid source 1908 may supply pressurized fluid to cavity 1906. Because lower die 1902 is constructed from a substantially rigid material, diaphragm 104 may elongate in tension as depicted in FIG. 19. Pressure is maintained within cavity 1906 while frame 102 is mechanically coupled with diaphragm 104. Diaphragm 104 may be secured to frame 102 using any number of previously discussed bonding techniques including mechanical fasteners, radiation curable adhesives, multi-part epoxies, heat curable adhesives or pressure sensitive compounds.

After diaphragm 104 has been fixed to frame 102, upper die 1904 may be removed. If desired, excess diaphragm material extending beyond the perimeter of frame 102 may be removed.

In this example technique, some of the initial tension generated by the pressurized fluid may relax during subsequent frame attachment process. Accordingly, a tension greater than the final desired tension may be initially induced via fluid source 1908 to assure that the film is properly tensioned during use.

Figure 20:
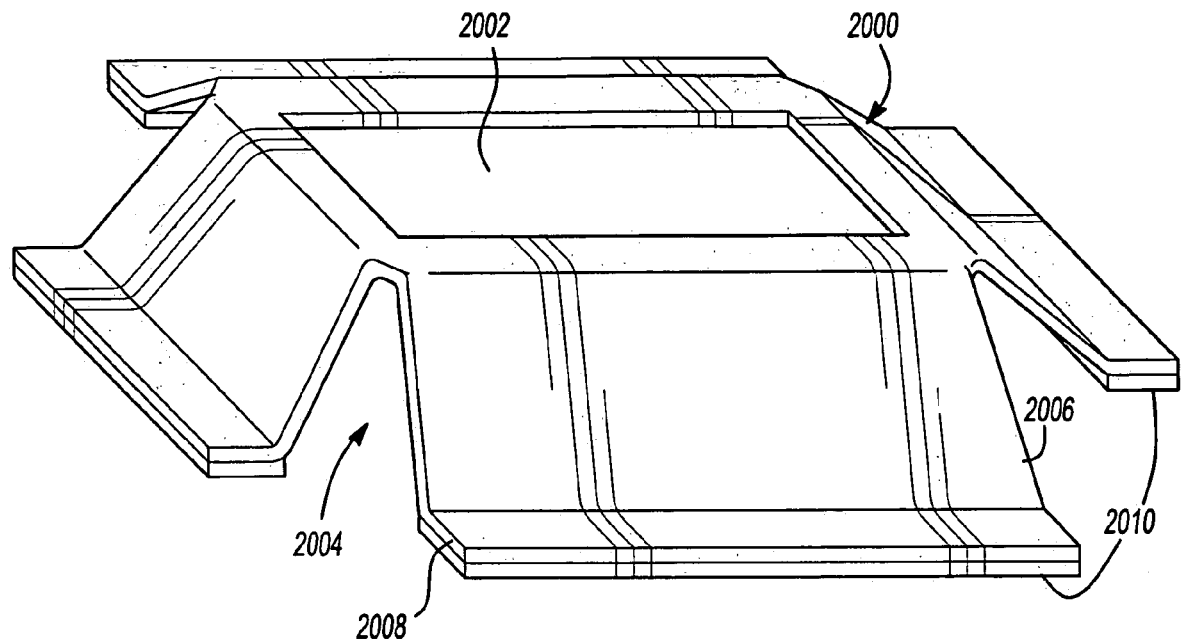
FIG. 20 is a perspective view of an alternate tensioning member.
Figure 21:
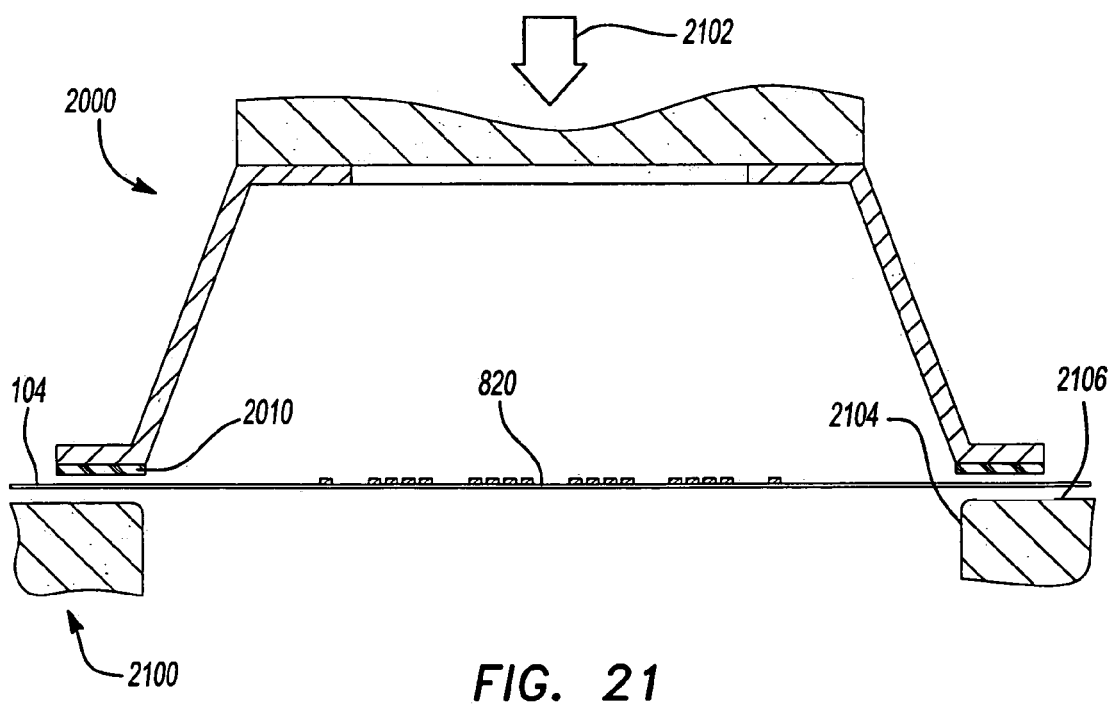
FIG. 21 is a cross-sectional side view depicting use of the alternate tensioning member shown in FIG. 20.
Figure 22:
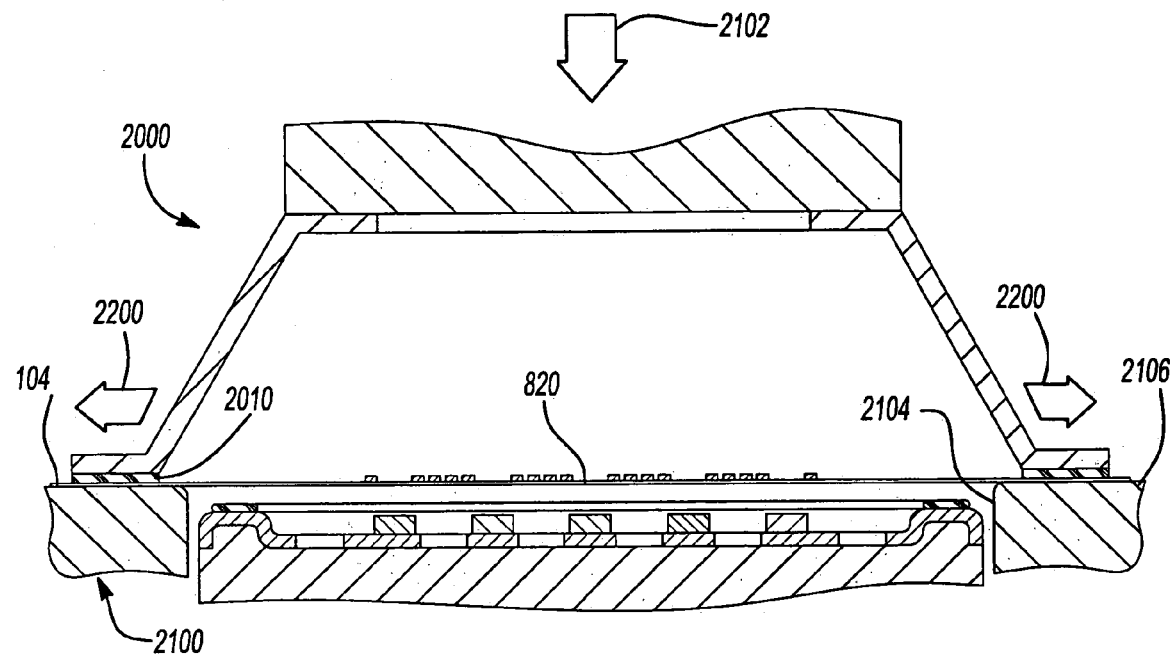
FIG. 22 is a cross-sectional side view further depicting diaphragm tensioning using the alternate tensioning member of FIG. 20.

FIGS. 20-22 depict another example of fixturing used to tension diaphragm 104 prior to attaching diaphragm 104 to frame 102. An example spider 2000 may operate in conjunction with an example base plate 2100 to tension diaphragm 104. Spider 2000 may be placed on a first side of diaphragm 104 while base plate 2100 may be placed on the opposite side of the diaphragm 104. Spider 2000 may function by converting an axial force applied in direction 2102 to a lateral tension produced in opposed directions 2200.

The illustrated spider 2000 is a generally pyramidal member having a hub 2002 positioned proximate to a truncated portion of the pyramid. A plurality of legs 2004 angularly extend from hub 2002. Each of the legs 2004 include a body portion 2006 and a foot portion 2008. Each foot portion 2008 radially extends from the distal end of each leg 2004. A pad 2010 is coupled (as shown in FIG. 20) to a lower surface of each foot 2008. Pads 2010 may be constructed from a high friction, elastomeric material that is suitable for gripping diaphragm 104 without causing damage to diaphragm 104.

The illustrated base plate 2100 is a generally rectangularly-shaped member having an aperture 2104 extending through the base plate 2100. Aperture 2104 may be shaped similarly to the perimeter of frame 102 and sized such that frame 102 may be inserted into aperture 2104. Base plate 2100 includes a low friction surface 2106 upon which diaphragm 104 may freely slide. As best shown in FIG. 21, each pad 2010 is supported by a portion of base plate 2100.

During tensioning, diaphragm 104 may be placed between base plate 2100 and spider 2000. An axial force may be applied to spider 2000 in direction 2102. Due to the angular orientation of legs 2004 relative to low friction surface 2106, at least some of the axial force applied in direction 2102 may be converted to opposing forces in opposed directions 2200. The opposed forces may tension diaphragm 104. After tensioning, frame 102 is mechanically coupled to diaphragm 104 as previously discussed.

Figure 23:
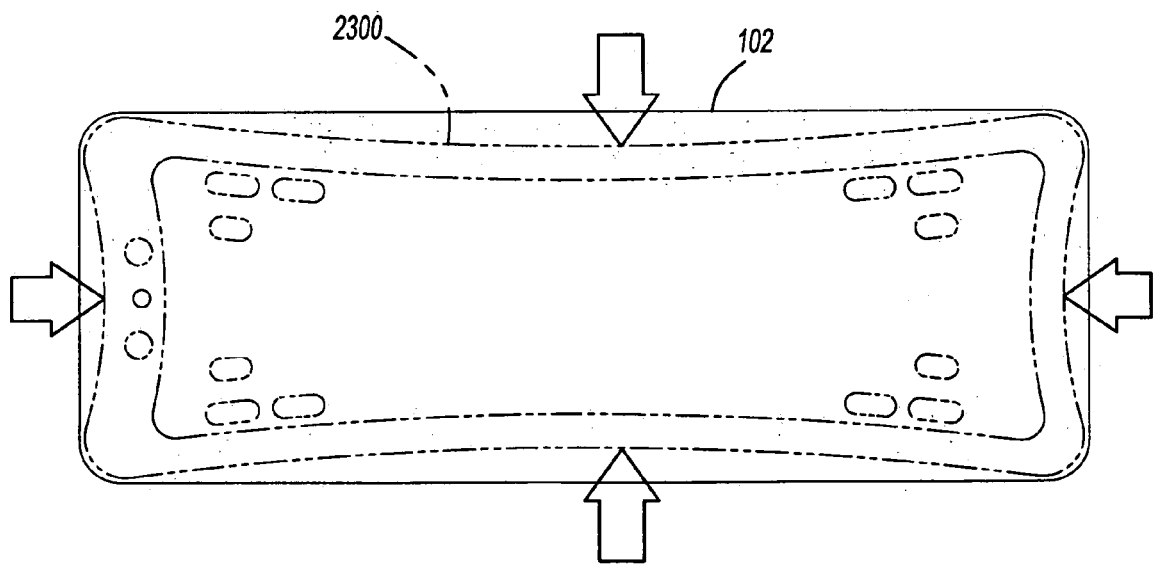
FIG. 23 depicts a frame in an undeformed state and a deformed state.

FIG. 23, is yet another example system for loudspeaker 100 assembly. In this system, frame 102 may be elastically deformed prior to attachment of diaphragm 104. The deformed frame 102 is represented in phantom lines at reference numeral 2300. It should be appreciated that any number of force generating devices or tools such as jack screws, hydraulic rams or other force producing devices may be used to elastically deform frame 102 by inwardly deflecting radially extending flange 304 and lip 306 (FIG. 3) of frame 102. Frame 102 may be maintained in the deformed state shown as 2300 while diaphragm 104 (FIG. 1) is attached to planar mounting surface 408 (FIG. 4).

Once diaphragm 104 has been securely attached to frame 102, the external forces deforming frame 102 may be released. Because frame 102 was elastically deformed, flange 304 and lip 306 have a tendency to spring-back to their originally undeformed state. This tendency is resisted by diaphragm 104. Diaphragm 104 elongates as the deformed frame attempts to return to its undeformed state until an equilibrium is reached. Frame 102 may be constructed from steel, aluminum or any number of composite materials capable of being deformed. Materials having a modulus of elasticity less than 29,000 KSI are contemplated to provide a relatively large elastic deformation prior to yield. A large frame deformation is beneficial to account for elongation or deformation of adhesive 406 or other mechanical coupling used to bond diaphragm 104 to frame 102.

Figure 24:
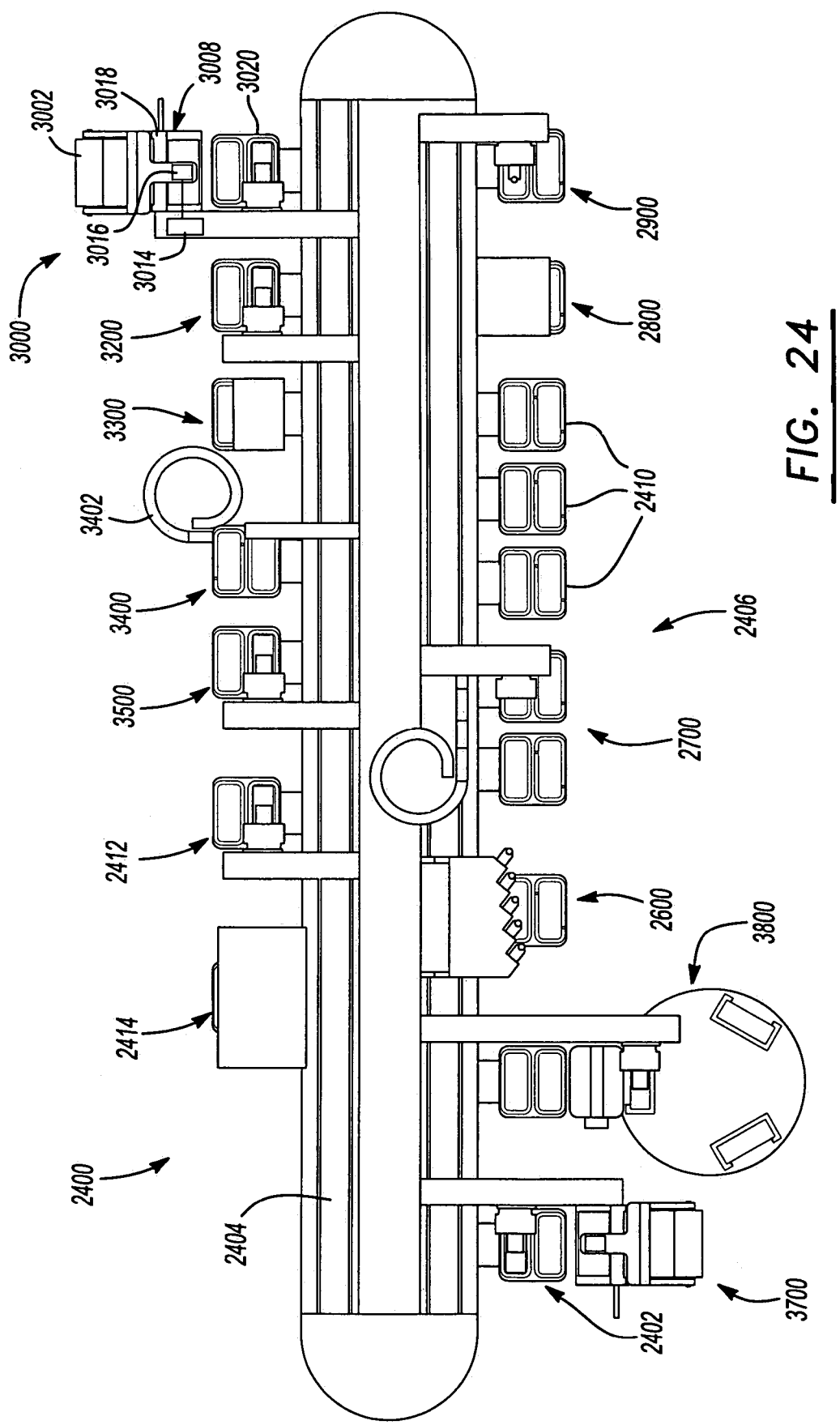
FIG. 24 is a plan view of an electro-dynamic loudspeaker assembly system.

An example planar loudspeaker assembly system 2400 is depicted in FIG. 24. Planar loudspeaker assembly system 2400 functions to construct a fully tested and finished planar loudspeaker from a variety of separate components in a relatively small space and a minimal amount of time.

Assembly system 2400 is a conveyor-type system utilizing a plurality of pallets 2402 traveling about a closed loop. Each of pallets 2402 is engaged by a drive belt or track 2404 to move the pallets 2402 around the loop in a counter-clockwise direction. A plurality of workstations 2406 are positioned along track 2404 to perform the process steps described hereinafter.

Figure 25:
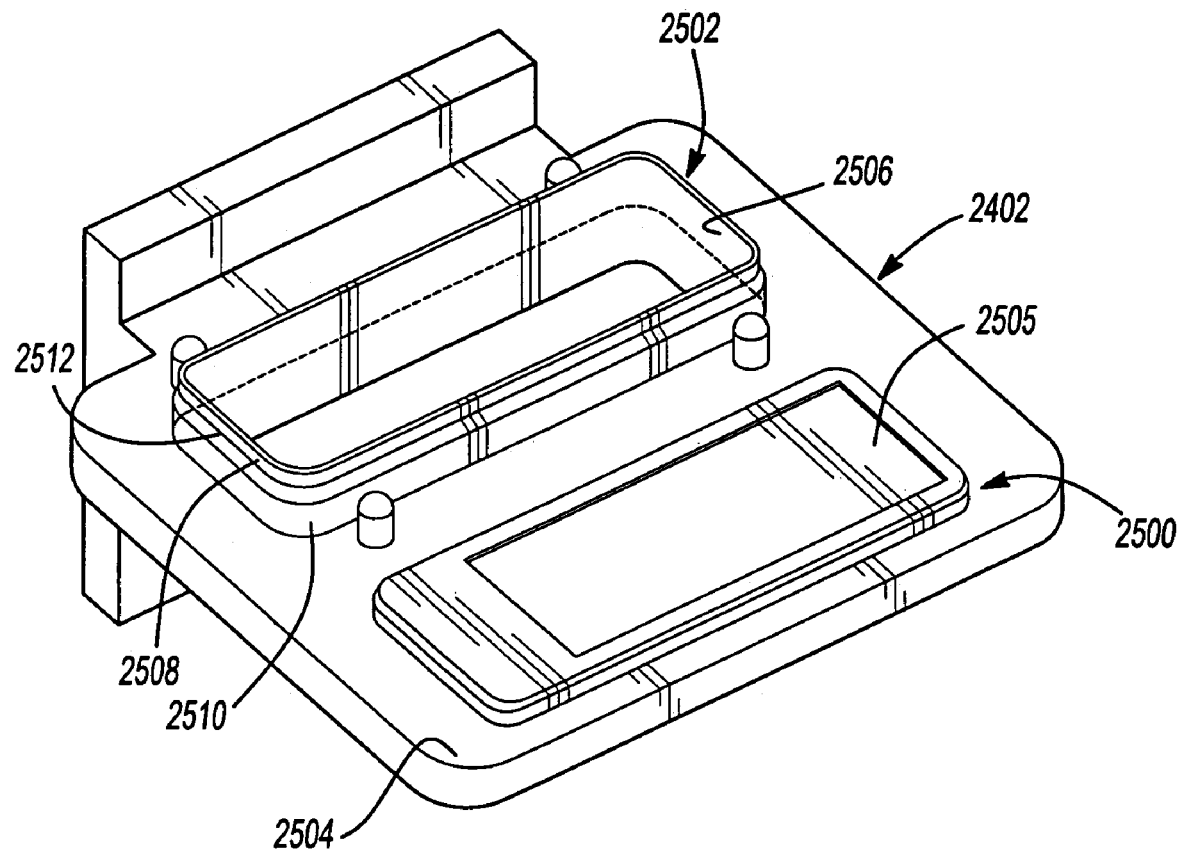
FIG. 25 is a perspective view of a pallet for use in the assembly system.
Figure 36:
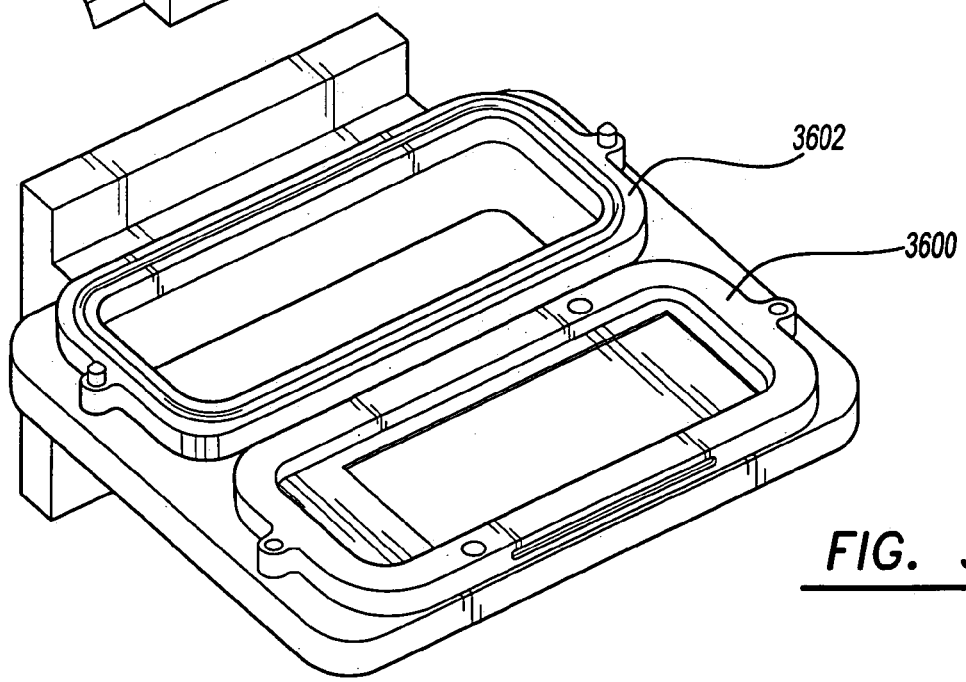
FIG. 36 is a perspective view of the pallet having a lower clamp frame and an upper clamp frame positioned thereon.

As best shown in FIG. 25, pallet 2402 includes a first protrusion 2500 and a second protrusion 2502 extending upwardly from an upper surface 2504. First protrusion 2500 includes a recess 2505. Second protrusion 2502 is rectangularly shaped and surrounds an aperture 2506. Aperture 2506 extends through the thickness of pallet 2402. Second protrusion 2502 includes a stepped sidewall 2508. Stepped sidewall 2508 includes a lower portion 2510. Stepped sidewall 2508 includes an upper portion 2512 that serves as a locating structure for frame 102. As shown in FIG. 36, an upper clamp half 3600 is placed over first protrusion 2500. A lower clamp half 3602 is positioned over second protrusion 2502.

Figure 37:
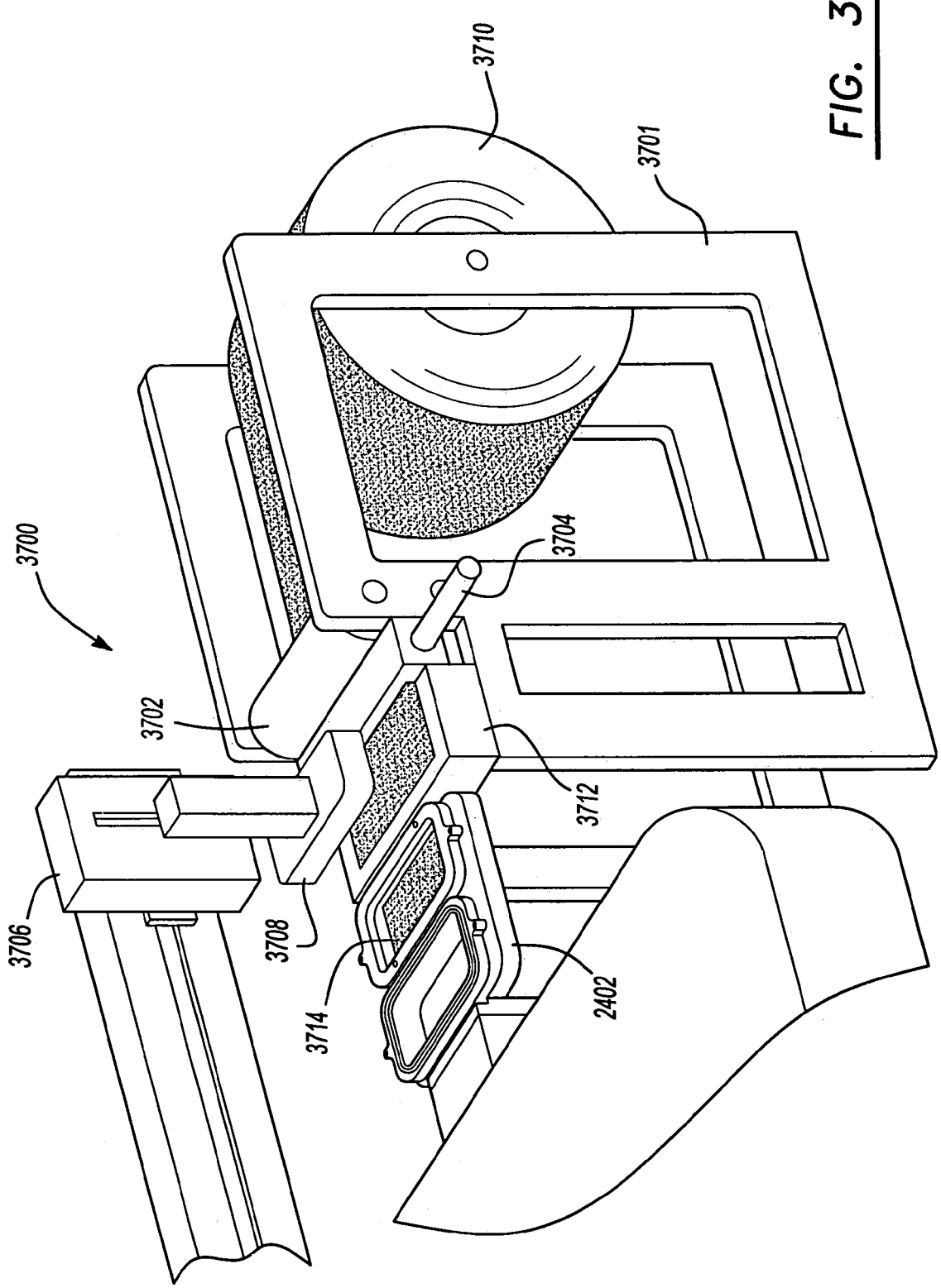
FIG. 37 is a perspective view of a felt cutting and loading station.

With reference to FIG. 37, pallet 2402 travels to a felt cutting and loading station 3700. The felt cutting and loading station 3700 includes a frame 3701, a dispenser 3702, a cutter 3704 and a robot 3706 having an end-effector 3708 coupled to robot 3706. A roll of felt 3710 is rotatably coupled to frame 3701. The free end of the roll of felt 3710 is fed into dispenser 3702. Dispenser 3702 is controllable to selectively index a portion of the roll of felt onto a block 3712. Once the appropriate width of felt has been dispensed on block 3712, feeder 3702 halts movement of felt roll 3710. Cutter 3704 separates a singular felt panel 3714 from the roll. At this time, robot 3706 positions end-effector 3708 above felt panel 3714 located on block 3712. Through the use of vacuum or a cloth gripping device, end-effector 3708 transfers felt panel 3714 to recess 2505 located in first protrusion 2500.

Figure 38:
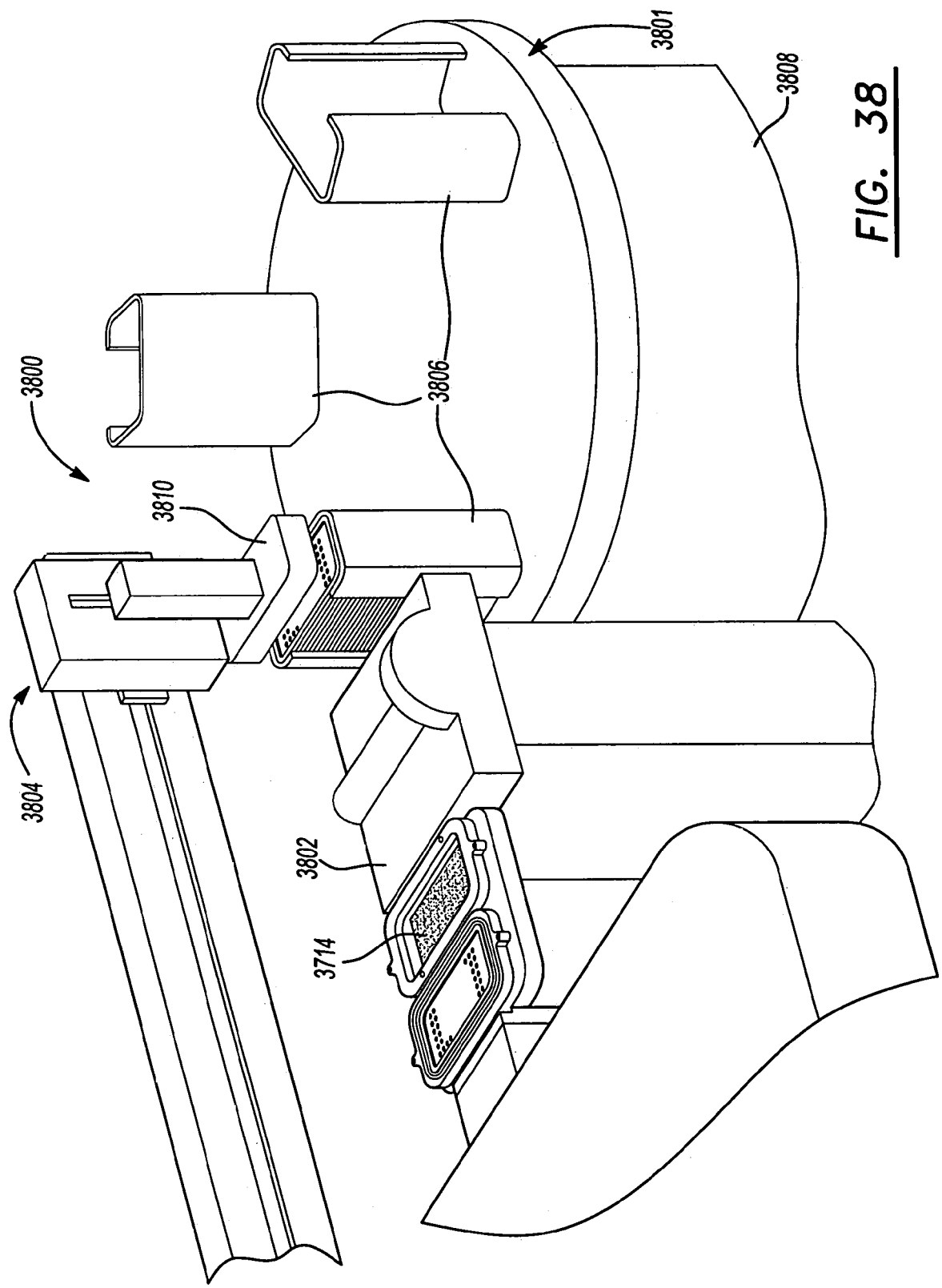
FIG. 38 is a perspective view of a frame loading station.

Pallet 2402 travels to a frame loading station 3800 shown in FIG. 38. Frame loading station 3800 includes a dial table 3801, a hot melt applicator 3802 and a robot 3804. Dial table 3801 includes three stacks 3806 rotatably mounted to a base 3808. The stack positioned beneath robot 3804 is defined as being in the active position. The other two stacks 3806 are positioned at inactive positions. An operator positioned adjacent inactive stacks 3806 loads frames 102 for later use at the active position. An elevator (not shown) positioned below dial table 3801 maintains the position of the upper most frame within the active stack at a predetermined elevation.

During operation of frame loading station 3800, robot 3804 positions a magnetic or vacuum end-effector 3810 over the active stack position. The end-effector removes the top frame from the active stack and rolls it across hot melt applicator 3802. Robot 3804 continues to translate frame 102 to a position over felt panel 3714. Frame 102, including a coating of hot melt adhesive, is pressed into contact with felt panel 3714 to adhere the felt to the frame. End-effector 3810 then places the frame and felt subassembly on upper portion 2512 of second protrusion 2502. Operation of frame loading station 3800 continues in this manner until all of the frames within the active stack have been used. At this time, dial table 3801 indexes to place one of the previously inactive stacks at the active stack location. An operator then fills the empty stack 3806 with frames 102.

Figure 26:
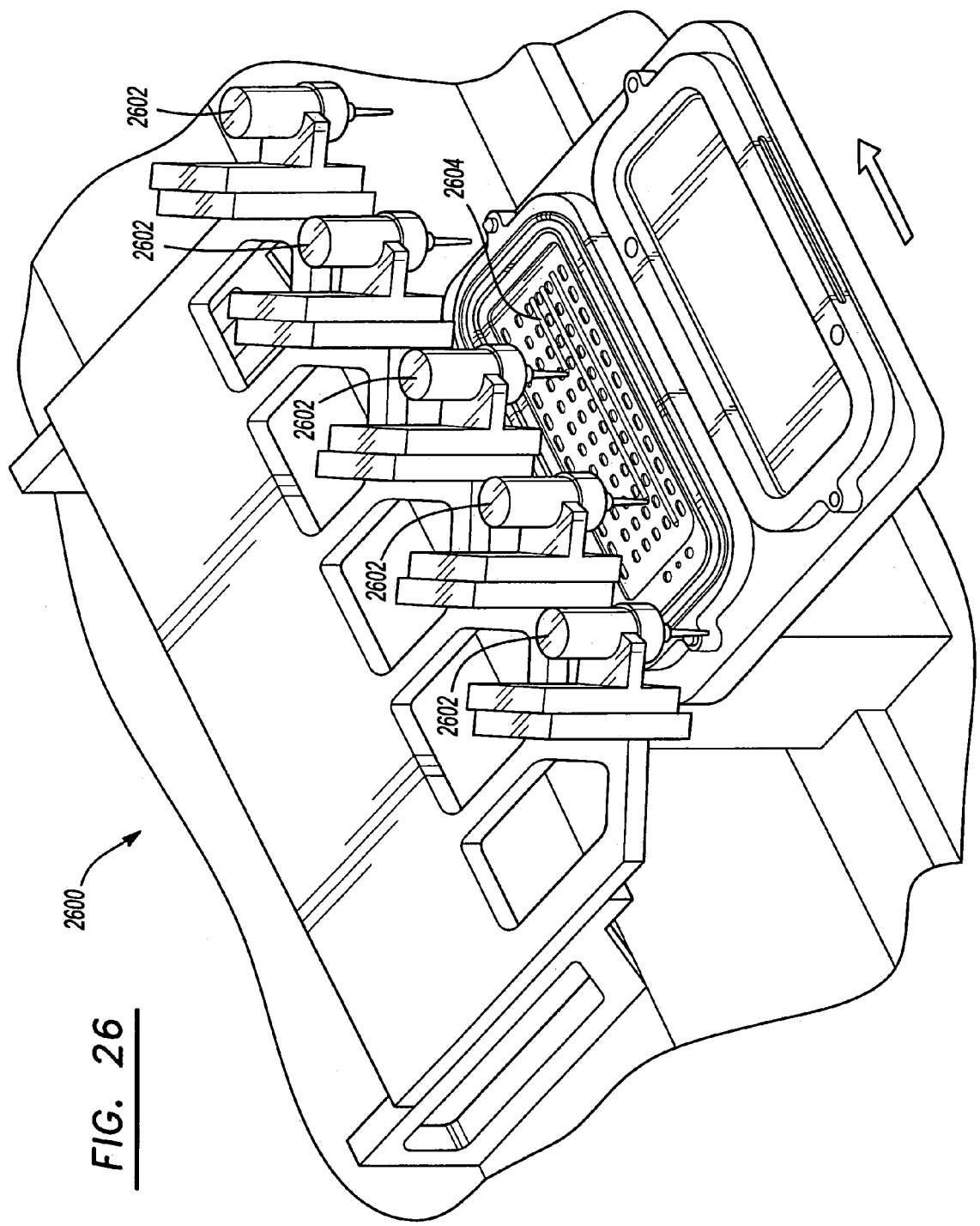
FIG. 26 is a perspective view of an adhesive application station.

As shown in FIG. 26, pallet 2402 continues to travel in a counter-clockwise direction through an adhesive application station 2600. Station 2600 includes five adhesive valves 2602 positioned in an offset manner to one another. Pallet 2402 passes under adhesive valves 2602 at a uniform rate. Each adhesive valve 2602 lowers to a dispensing height and applies an adhesive 2604 at an appropriate time to dispense five equally spaced ribbons of adhesive 2604 on frame 102. The opening and closing of valves 2602 is timed to correspond to the movement of pallet 2402. Five equal length adhesive ribbons 2604 are dispensed on frame 102 without stopping pallet 2402.

Figure 27:
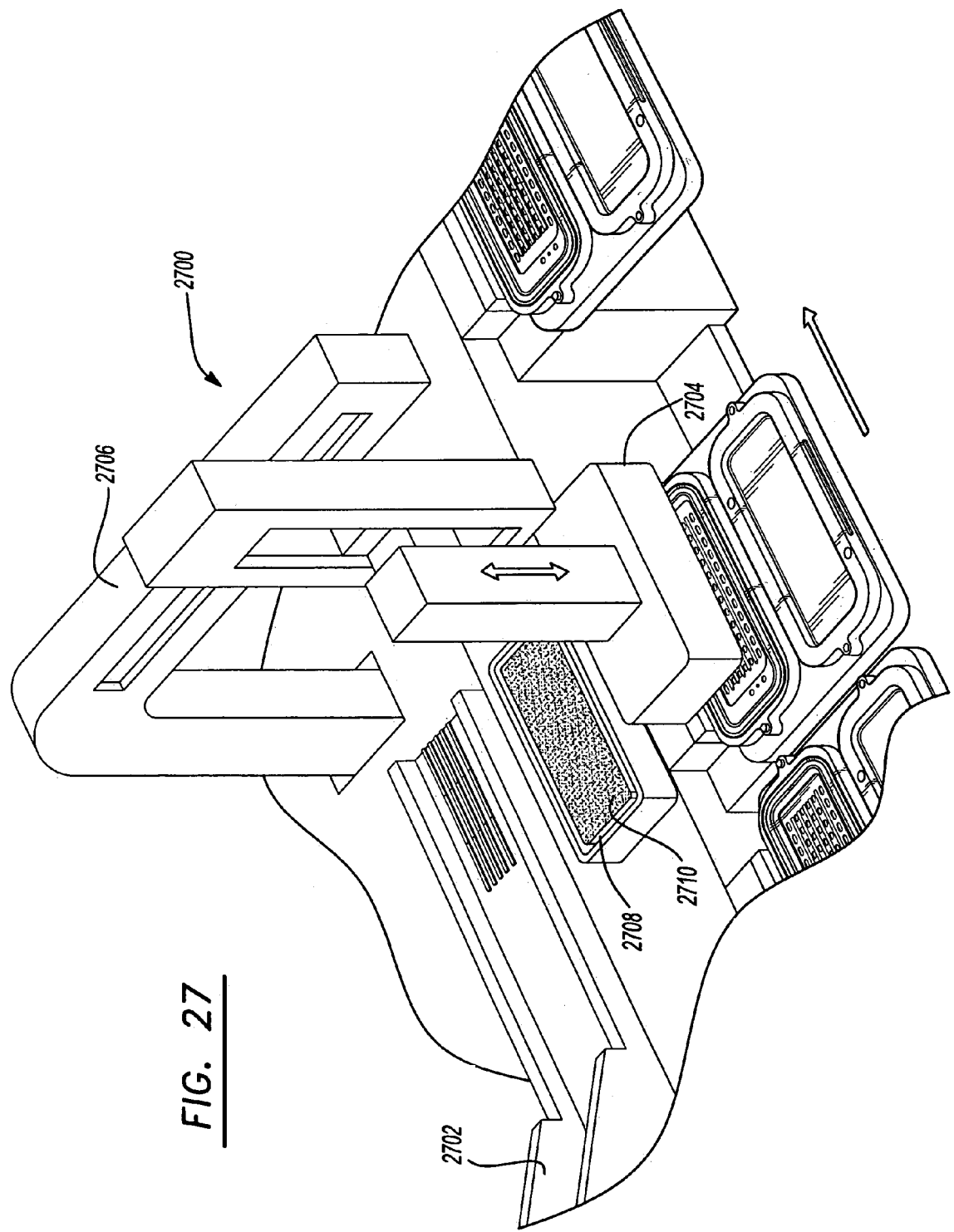
FIG. 27 is a perspective view of a magnet loading and adhesive activator application station.
Figure 28:
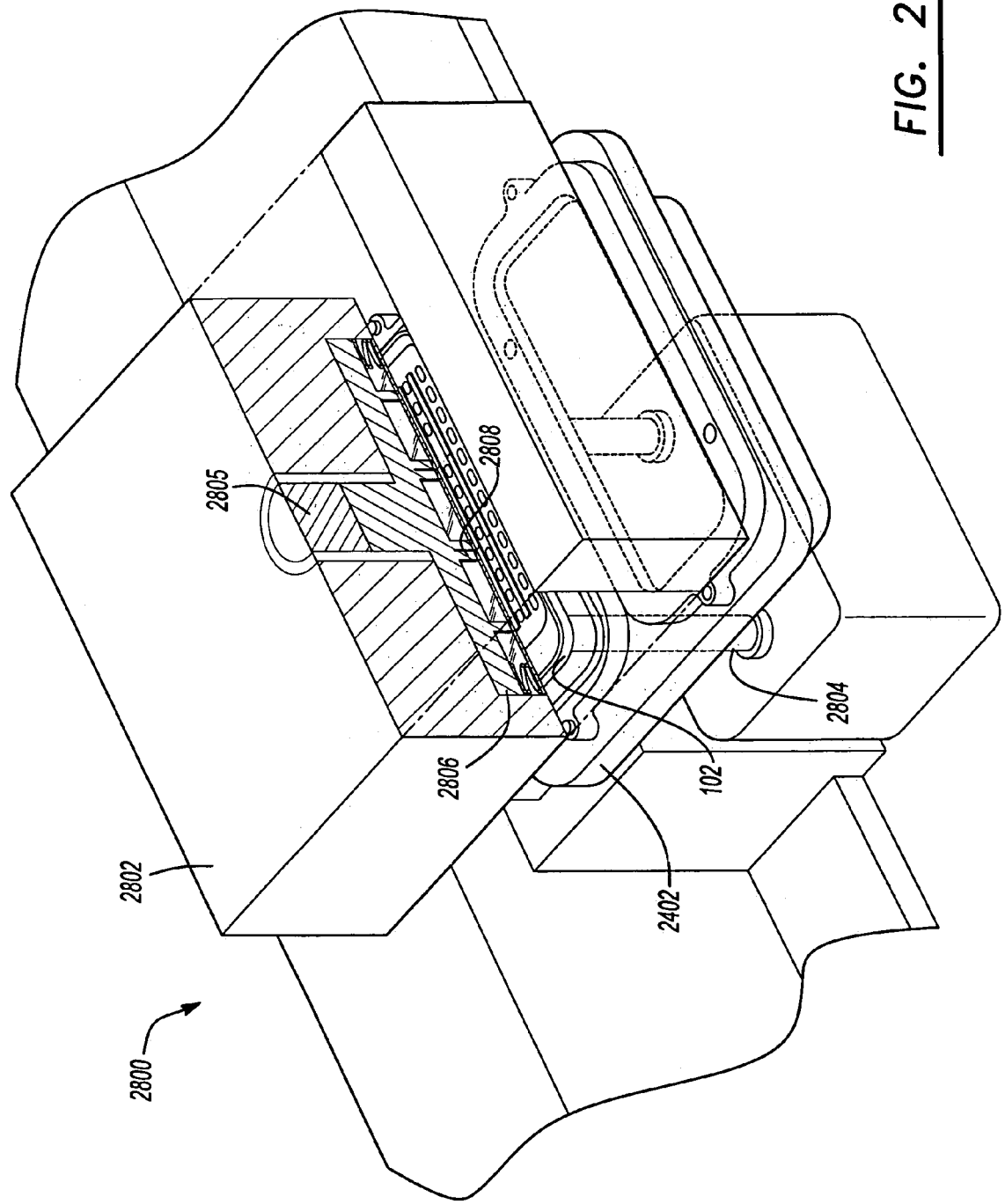
FIG. 28 is a perspective view of a magnetization station.

Pallet 2402 continues to travel to a magnet loading station 2700 depicted at FIG. 27. At magnet loading station 2700, a bowl feeder 2702 presents fifteen magnets 202 correctly oriented in a pattern of five rows and three columns. It should be appreciated that other high speed feeding mechanisms may be utilized to correctly present and orient magnets 202. Referring to FIG. 27, an end-effector 2704 is mounted to a robot or pick-and-place mechanism 2706 to allow movement of end effector 2704 within station 2700. End-effector 2704 is positioned immediately above placed magnets 202 at bowl feeder 2702. End-effector 2704 is then energized to temporarily couple magnets 202 to end effector 2704. Robot 2706 then moves end-effector 2704 above an adhesive activator applicator pad 2708. Each of magnets 202 attached to end-effector 2704 are then pressed against adhesive activator applicator pad 2708 to apply an adhesive activator 2710 to the bottom of magnets 202. End-effector 2704 along with magnets 202 are next indexed to a location above frame 102. End-effector 2704 is axially lowered to press magnets 202 into adhesive 2604 and mix adhesive activator 2710 with adhesive 2604 to start the chemical reaction to secure magnets 202 to frame 102. Adhesive 2604 and adhesive activator 2710 illustratively complete a two-part adhesive. One skilled in the art will appreciate that the two-part adhesive is merely exemplary and that a variety of other magnet bonding methods may be incorporated without departing from the scope of the invention. For example, a one-part heat curable adhesive, mechanical fasteners, or welding techniques may be used.

Pallet 2402 next travels along track 2404 to acrylic curing stations 2410. Pallet 2402 passes through acrylic curing stations 2410 to allow the two-part adhesive time to cure. After magnets 202 are firmly secured to frame 102, they are magnetized at a magnetizing station 2800. Within magnetization station 2800, frame 102 is raised to be within close proximity to an energy source 2802. Each of the magnets within any one row are magnetized having the same polarity. Magnets of immediately adjacent rows are magnetized with the opposite polarity to create the magnetic flux fields described earlier. After energization, frame 102 and magnets 202 are separated from energy source 2802 via a cylinder 2805 and lowered onto pallet 2402. Specifically, a plate 2806 including a plurality of posts 2808 are lowered such that two posts 2808 contact each magnet to separate the magnetized magnets and frame from energy source 2802.

Figure 29:
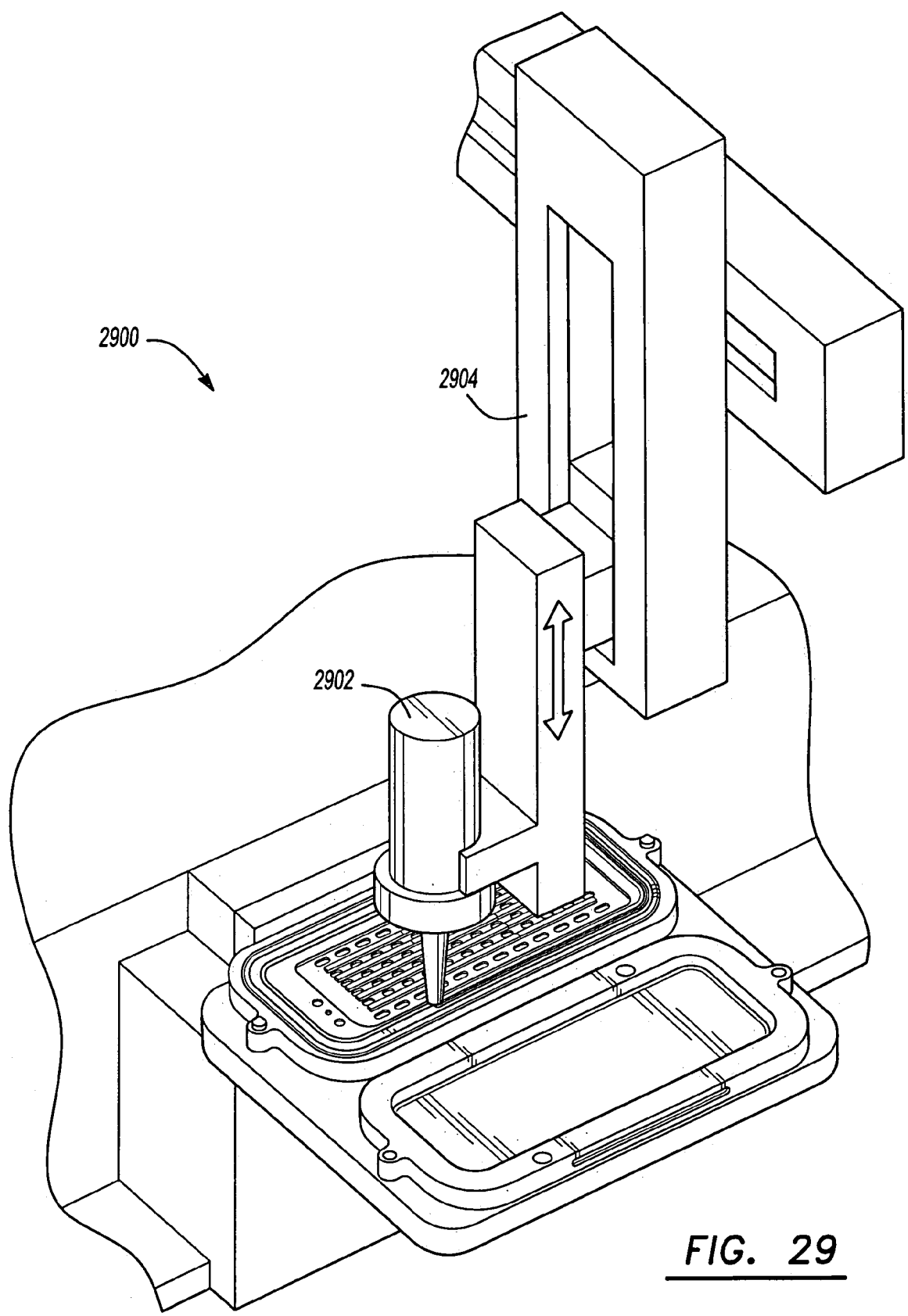
FIG. 29 is a perspective view of an adhesive application station.
Figure 30:
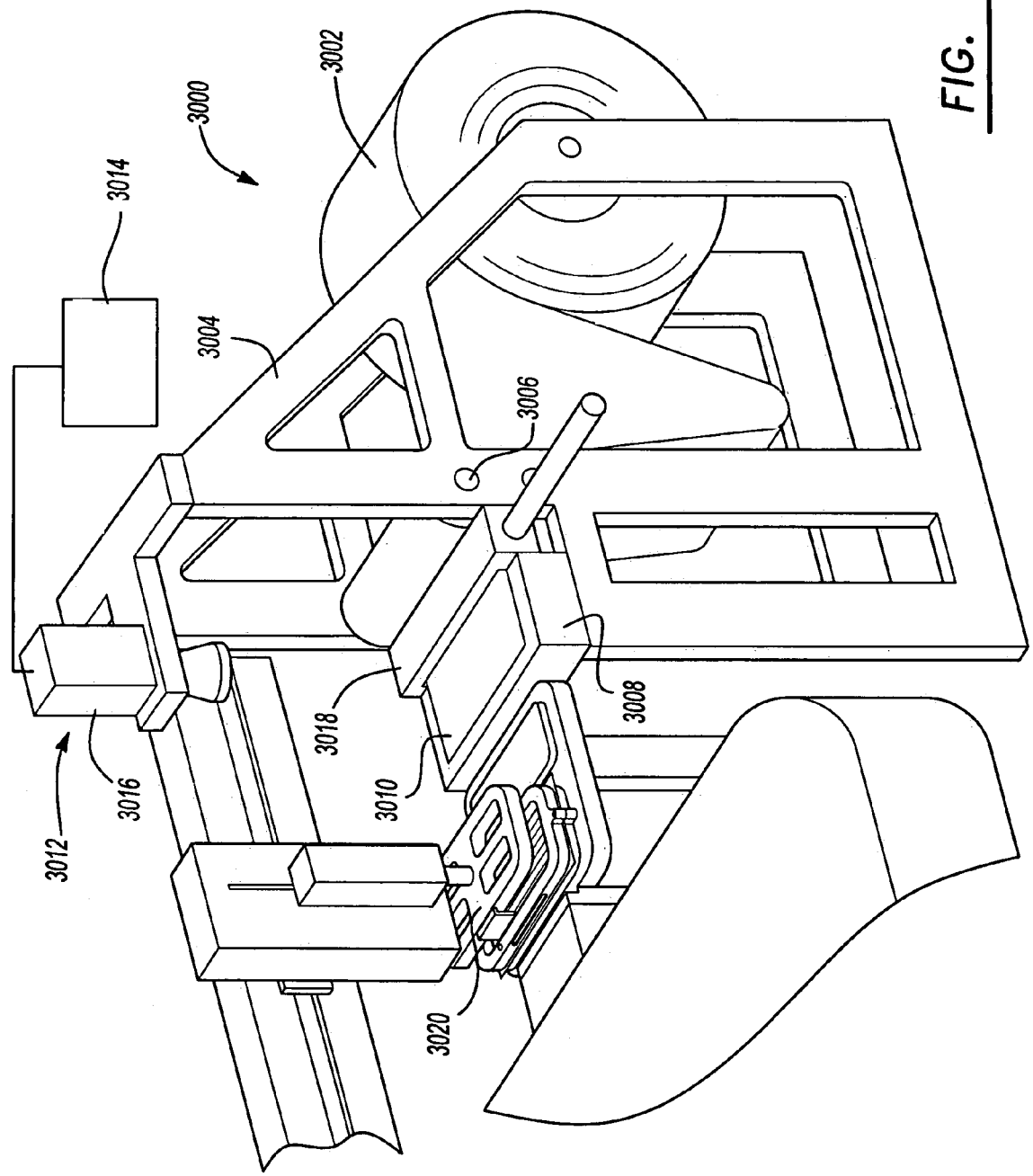
FIG. 30 is a perspective view of a diaphragm loading station.

After magnetization, pallet 2402 travels to diaphragm adhesive application station 2900 shown in FIG. 29. Station 2900 includes an adhesive applicator 2902 mounted to a Cartesian arm 2904. Adhesive applicator 2902 applies adhesive 406 to planar mounting surface 414 of frame 102. In the preferred embodiment, movement of pallet 2402 is controlled while adhesive is being applied. Motion control along an X axis will be provided by track 2404 and motion along the Y and Z axes will be provided by Cartesian arm 2904.

Pallet 2402 next travels to a diaphragm loading station 3000. Diaphragm loading station 3000 loads diaphragm 104 onto frame 102. In a preferred embodiment, a roll 3002 of diaphragms 104 is rotatably mounted on a frame 3004. The roll 3002 of diaphragms 104 consists of a continuous sheet of film 400 having a plurality of conductors 106 spaced apart and positioned along the length of film 400. The continuous sheet of film 400 is rolled for convenient handling in a production environment. A free end of diaphragm roll 3002 is inserted into a feeder 3006. Feeder 3006 is positioned adjacent a vacuum platen 3008. During operation, feeder 3006 is selectively operable to dispense material from diaphragm roll 3002 onto an upper surface 3010 of vacuum platen 3008. A vision system 3012 includes a controller 3014 and a camera 3016. Camera 3016 is preferably positioned atop frame 3004 to have a clear view of the end portion of diaphragm roll 3002 being positioned on upper surface 3010 of vacuum platen 3008. Camera 3016 communicates diaphragm position information to controller 3014.

Once the free end of diaphragm roll 3002 has been indexed to a desired position to position a diaphragm 104 on upper surface 3010 of vacuum platen 3008, controller 3014 instructs feeder 3006 to maintain the current position of the diaphragm roll. Camera 3016 also communicates the lateral position of the conductor 106 on the diaphragm 104 on upper surface 3010 of vacuum platen 3008 to controller 3014. The position of pallet 2402 is adjusted to align speaker frame 102 with the current position of the conductor 106 on the upper surface 3010 of vacuum platen 3008.

Once the pallet and diaphragm 104 on upper surface 3010 of vacuum platen 3008 have been positioned as described, vacuum is applied to vacuum platen 3008. As such, the end portion of diaphragm roll 3002 containing diaphragm 104 that is positioned on upper surface 3010 of vacuum platen 3008 is temporarily fixed to vacuum platen 3008. A cutter 3018 separates diaphragm 104 from diaphragm roll 3002.

After diaphragm 104 is severed from diaphragm roll 3002, an end-effector 3020 picks up upper clamp half 3600 from its storage position on pallet 2402. End-effector 3020 positions upper clamp half 3600 on the cut diaphragm while vacuum is supplied to vacuum platen 3008. End-effector 3020 next supplies vacuum to the perimeter of upper clamp half 3600 as well. The vacuum supply to vacuum platen 3008 is turned off and a slight positive pressure is applied to diaphragm 104 from upper surface 3010 of vacuum platen 3008. Next, end-effector 3020 transfers upper clamp half 3600 and diaphragm 104 to a position over pallet 2402. End-effector 3020 then lowers upper clamp half 3600 and diaphragm 104 into contact with lower clamp half 3602 effectively trapping diaphragm 104 between the upper and lower clamp halves in a non-tension state. The vacuum supplied to end-effector 3020 is turned off and end-effector 3020 releases upper clamp half 3600 to complete the cycle at diaphragm loading station 3000.

Figure 31:
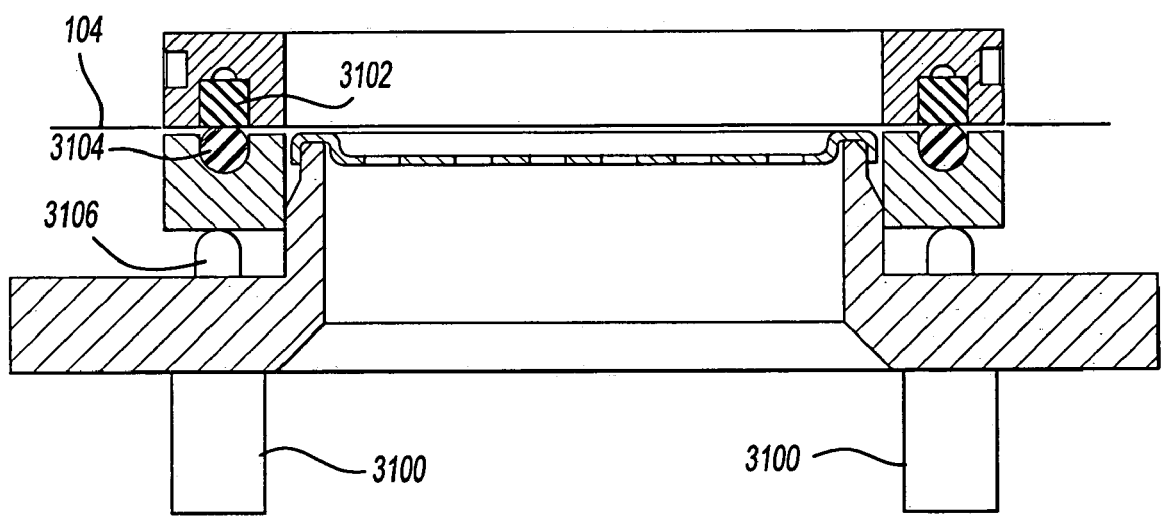
FIG. 31 is a cross-sectional view of speaker components and fixturing located after completing diaphragm loading as depicted in FIG. 30.
Figure 32:
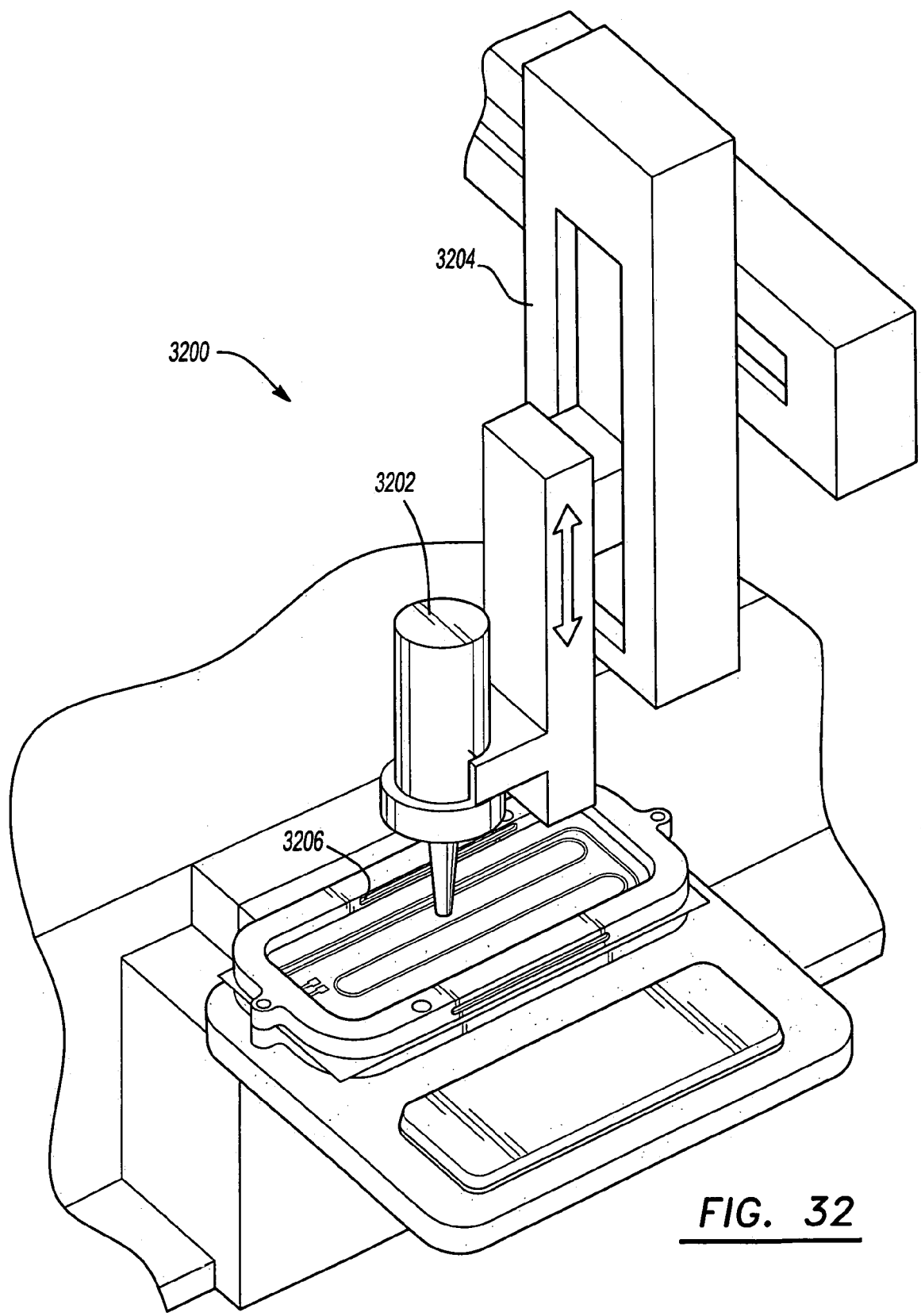
FIG. 32 is a perspective view of an edge treatment compound application station.
Figure 33:
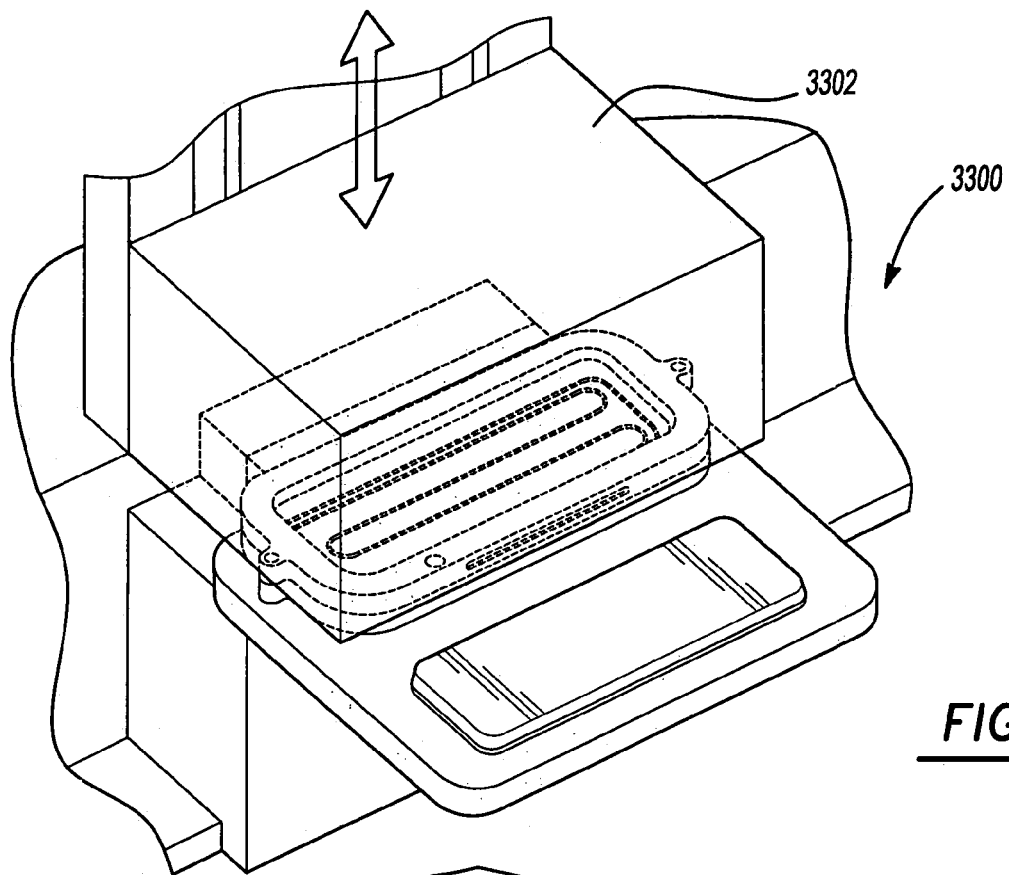
FIG. 33 is a perspective view of a clamping and irradiation station.
Figure 34:
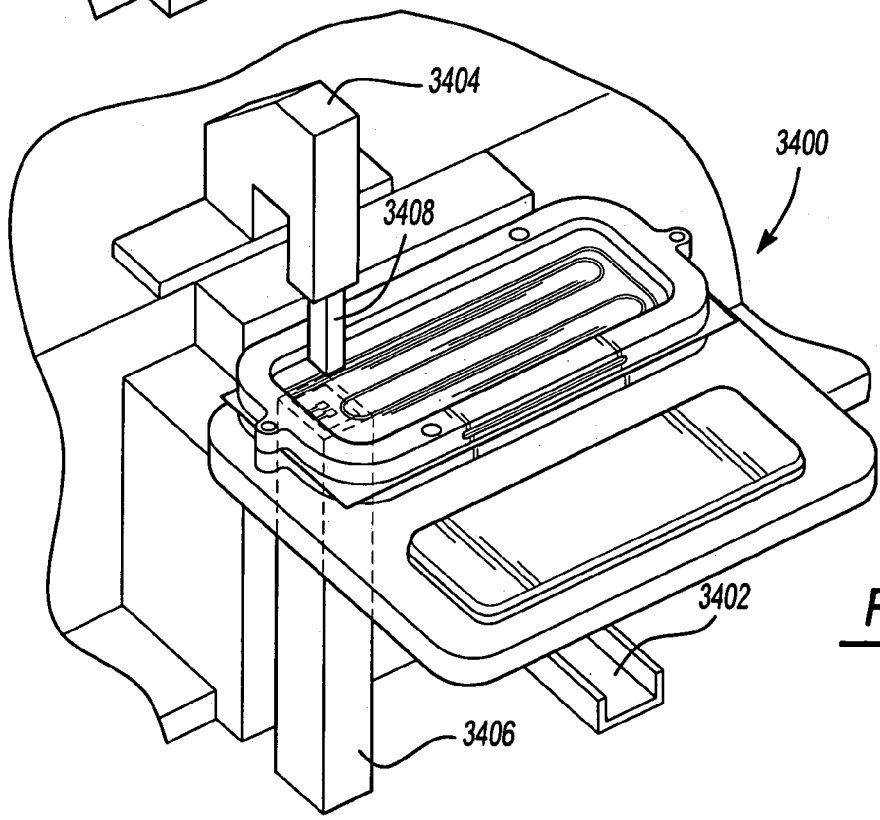
FIG. 34 is a perspective view of a terminal crimping station.
Figure 35:
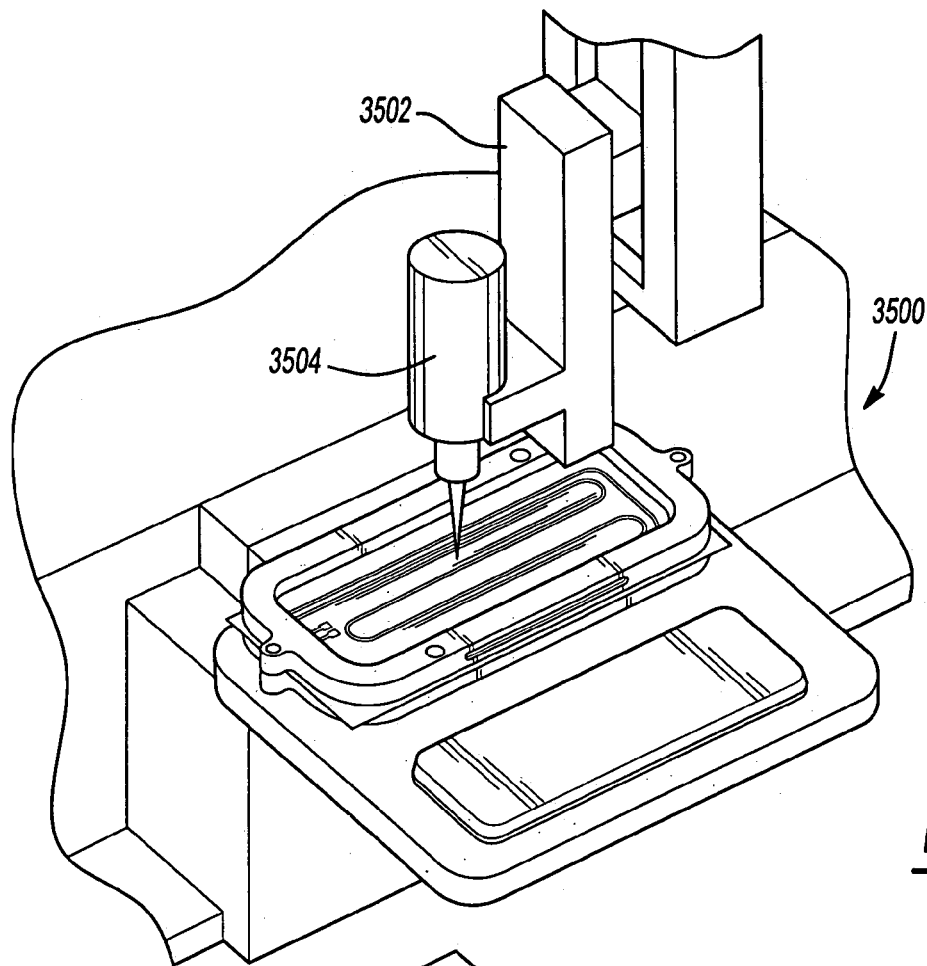
FIG. 35 is a perspective view of a diaphragm trimming station.

With reference to FIG. 31, pallet 2402 is depicted in cross-section after the process steps conducted at diaphragm loading station 3000 have been completed. At this time, lower clamp half 3602, diaphragm 104, and upper clamp half 3600 are suspended on a set of spring plungers 3100. The weight of upper clamp half 3600 is transferred through an elastomeric seal 3102, diaphragm 104, an elastomeric seal 3104 and lower clamp half 3602. This arrangement maintains diaphragm 104 in a non-tensioned state. Spring plungers 3100 include axially disposable end portions 3106 which are shown in their fully extended positions in FIG. 31. End portions 3106 and lower clamp half 3602 are sized to position diaphragm 104 at a plane above the adhesive and frame subassembly.

Pallet 2402 next travels to an edge treatment application station 3200. Edge treatment application station 3200 includes a valve 3202 coupled to a Cartesian arm 3204. Valve 3202 applies an edge treat compound 3206 to the perimeter of diaphragm 104 as movement of pallet 2402 is controlled within application station 3200. Motion control along an X axis will be provided by track 2404 and motion along the Y and Z axes will be provided by Cartesian arm 3204. Edge treat compound 3206 functions to dampen unwanted harmonic or spurious vibrations of diaphragm 104 during speaker operation. Preferably, edge treat compound 3206 is a liquid urethane oligomer acrylic monomer blend such as Dymax 4-20539, that cures to a flexible solid.

Pallet 2402 travels next to a film tensioning and adhesive curing station 3300. At station 3300, a radiation source 3302 extends downwardly and forces upper clamp half 3600 downward toward lower clamp half 3602. The reaction force generated from springs within spring plungers 3100 creates a clamping force between upper clamp half 3600 and lower clamp half 3602 to restrain the perimeter of diaphragm 104. Depending on the tensioning method utilized, the upper and lower clamp halves may be downwardly displaced to a predetermined position, or may be displaced until a certain force is generated, or may be displaced until a certain resonance frequency is generated or until a certain deflection of diaphragm 104 per unit load is defined.

As upper clamp half 3600 moves downward, diaphragm 104 is lowered into contact with adhesive 406 positioned on planar mounting surface 414. Upper clamp half 3600 continues to move downward stretching film 400 over frame 102 until the desired tension in diaphragm 104 is achieved. When the tensioning process is complete, radiation source 3302 is turned on to cure adhesive 406 and edge treat compound 3206. After completion of the exposure to the radiation, radiation source 3302 is turned off and retracted.

Any number of bonding agents may be used to couple diaphragm 104 to frame 102. In the preferred embodiment, an adhesive curable by exposure to light in the visible spectrum such as Loctite Corp. 3106 is used. However, adhesives curable by exposure to ultra-violet light or other types of radiation may also be used. Certain pressure sensitive compounds may also be used. Beneficially, pressure sensitive compounds do not require the use of light permeable diaphragms and fixturing that allows light to pass to the bonded perimeter. Heat curable adhesives may also be used.

Pallet 2402 next travels to a terminal insertion station 3400. Terminal insertion station 3400 has a vibratory bowl feeder 3402 that works in conjunction with a terminal crimper 3404 and a terminal insertion tool 3406. Vibratory bowl feeder 3402 orients a large quantity of conductor assemblies 230 and individually feeds terminal assemblies one at a time to an escapement positioned below vibratory bowl feeder 3402. As pallet 2402 enters terminal insertion station 3400, a pressure pad 3408 extends downwardly from terminal crimper 3404 to engage speaker 100 near first end 204 and second end 206 of conductor 106. Terminal insertion tool 3406 obtains a single conductor assembly 230 from the escapement and installs it through apertures 214 and 216 of frame 102. During the insertion operation, the terminals pierce diaphragm 104 at first end 204 and second end 206 to form an electrical connection thereto. Crimper 3404 crimps the two electrical terminals to diaphragm 104. Additionally, crimper 3404 couples conductor assembly 230 by mechanically deforming fastener 226 at the same time the electrical terminals are crimped. Terminal insertion tool 3406 and crimper 3404 then retract.

Pallet 2402 next travels to a diaphragm trim station 3500. Diaphragm trim station 3500 includes a cartesian arm 3502 equipped with a cutter 3504. Once pallet 2402 arrives at diaphragm trim station 3500, Cartesian arm 3502 lowers cutter 3504 into engagement with diaphragm 104 to trim excess film 400 from diaphragm 104. The X axis motion for cutter 3504 is provided by track 2404. Motion along the Y and Z axes is provided by Cartesian arm 3502.

Pallet 2402 next travels to an unclamping station 2412. At unclamping station 2412, upper clamp half 3600 is removed and placed on protrusion 2500 of pallet 2402. The excess film that was previously trimmed from diaphragm 104 is also removed and discarded.

Pallet 2402 next travels to a test station 2414. At test station 2414, speaker 100 is acoustically tested. During the acoustical test, the completed electro-dynamic loudspeaker 100 is excited using a predefined input. The actual acoustical output from each loudspeaker 100 is compared to a target output. The actual output and target output are compared to determine if the speaker meets quality standards previously defined. Tested loudspeaker 100 is removed from pallet 2402 and is sorted according to the results of the acoustical test. Pallet 2402 continues to travel along track 2404 and returns to frame loading station 2408 to begin the process once again.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A method of tensioning a diaphragm for an electrodynamic loudspeaker, comprising:
   positioning the diaphragm in a spaced relationship to permanent magnets affixed to a frame having a body and a flange, where the flange radially extends from the body about the periphery of the frame;
   coupling the diaphragm to the flange of the frame; and
   mechanically deforming the frame to elongate and tension the diaphragm.

2. The method of claim 1 includes forming a fulcrum in the frame about which the diaphragm is tensed.

3. The method of claim 1 further including the step of determining the tension after an initial elongation of the diaphragm and further elongating the diaphragm if additional tension is desired.

4. The method of claim 3 where the step of determining the tension includes placing a known load on the diaphragm and measuring the deflection of the diaphragm during loading.

5. The method of claim 1 wherein the step of mechanically deforming the frame to elongate and tension the diaphragm comprises bending the outer periphery of the frame downwardly with respect to the body of the frame.

6. The method of claim 5 wherein the outer periphery of the frame is moved a predetermined deflection distance from its initial position during bending.

7. A method of tensioning a diaphragm for an electrodynamic loudspeaker, comprising:
   positioning the diaphragm in a spaced relationship to permanent magnets affixed to a frame having a body and a flange, where the flange radially extends from the body about the periphery of the frame;
   coupling the diaphragm to the flange of the frame; and
   mechanically deforming the frame at a plurality of discrete locations of the frame to elongate and tension the diaphragm.

8. The method of claim 7 includes forming a fulcrum in the frame about which the diaphragm is tensed.

9. The method of claim 7 further including the step of determining the natural frequency of the diaphragm during the deforming step and continuing to deform the frame until a predetermined target frequency is reached.

10. The method of claim 7 further including the step of determining the tension after an initial elongation of the diaphragm and further elongating the diaphragm if additional tension is desired.

11. The method of claim 10 where the step of determining the tension includes placing a known load on the diaphragm and measuring the deflection of the diaphragm during loading.

12. A method of tensioning a diaphragm for an electrodynamic loudspeaker, comprising:
   positioning the diaphragm in a spaced relationship to permanent magnets affixed to a frame having a body and a flange;
   coupling the diaphragm to the flange of the frame;
   mechanically deforming the frame to elongate and tension the diaphragm; and
   determining the natural frequency of the diaphragm during the deforming step and continuing to deform the frame until a predetermined target frequency is reached.

13. The method of claim 12 where the flange radially extends from the body about the periphery of the frame.

14. The method of claim 12 where the step of deforming the frame occurs at a plurality of discrete locations of the frame.

15. The method of claim 12 includes forming a fulcrum in the frame about which the diaphragm is tensed.

16. The method of claim 12 further including the step of determining the tension after an initial elongation of the diaphragm and further elongating the diaphragm if additional tension is desired.

17. The method of claim 16 where the step of determining the tension includes placing a known load on the diaphragm and measuring the deflection of the diaphragm during loading.

18. A method of tensioning a diaphragm for an electrodynamic loudspeaker, comprising:
   positioning the diaphragm in a spaced relationship to permanent magnets affixed to a frame having a body and a flange;
   coupling the diaphragm to the flange of the frame;
   forming a fulcrum in the frame about which the diaphragm is tensed; and
   mechanically deforming the frame to elongate and tension the diaphragm.

19. The method of claim 18 where the step of deforming the frame occurs at a plurality of discrete locations of the frame.

20. The method of claim 18 further including the step of determining the tension after an initial elongation of the diaphragm and further elongating the diaphragm if additional tension is desired.

21. The method of claim 20 where the step of determining the tension includes placing a known load on the diaphragm and measuring the deflection of the diaphragm during loading.

22. A method of tensioning a diaphragm for an electrodynamic loudspeaker, comprising:
   positioning the diaphragm in a spaced relationship to permanent magnets affixed to a frame having a body and a flange;
   coupling the diaphragm to the flange of the frame;
   mechanically deforming the flame to elongate and tension the diaphragm; and
   determining the tension after an initial elongation of the diaphragm and further elongating the diaphragm if additional tension is desired.

23. The method of claim 22 where the step of determining the tension includes placing a known load on the diaphragm and measuring the deflection of the diaphragm during loading.

24. The method of claim 22 where the step of deforming the frame occurs at a plurality of discrete locations of the frame.

* * * * *